United States Patent
Thompson et al.

(10) Patent No.: US 6,880,202 B2
(45) Date of Patent: Apr. 19, 2005

(54) DIRECTIONAL LOCK

(75) Inventors: Ralph Thompson, Burlington (CA); Geoff Rutherford, Milton (CA); Brian Freeborn, Mississauga (CA)

(73) Assignee: M.C. Healthcare Products Inc., Beamsville (CA)

( * ) Notice: Subject to any disclaimer, the term of this patent is extended or adjusted under 35 U.S.C. 154(b) by 0 days.

(21) Appl. No.: 10/406,253

(22) Filed: Apr. 4, 2003

(65) Prior Publication Data

US 2004/0194221 A1 Oct. 7, 2004

(51) Int. Cl.$^7$ ............................. B60B 33/00; A61G 7/08
(52) U.S. Cl. ............................. 16/35 R; 5/620; 5/86.1
(58) Field of Search ............................. 16/35 R; 5/620, 5/86.1

(56) References Cited

U.S. PATENT DOCUMENTS

| | | |
|---|---|---|
| 2,675,285 A | 4/1954 | Terry et al. |
| 3,003,159 A | 10/1961 | Herbert et al. |
| 3,220,020 A | 11/1965 | Nelson |
| 3,636,586 A | 1/1972 | Bollinger et al. |
| 3,676,881 A | 7/1972 | Duprey |
| 3,860,992 A * | 1/1975 | Legg ..................... 16/35 R |
| 4,023,849 A | 5/1977 | Bethlen |
| 4,037,291 A | 7/1977 | Huempfner et al. |
| 4,062,075 A | 12/1977 | Stern et al. |
| 4,097,939 A | 7/1978 | Peck et al. |
| 4,385,414 A | 5/1983 | Damico |
| 4,472,845 A | 9/1984 | Chivetta et al. |
| 4,685,160 A | 8/1987 | Rizzardo |
| 4,788,741 A | 12/1988 | Hilborn |
| 4,793,445 A | 12/1988 | Collignon et al. |
| 5,084,922 A | 2/1992 | Louit |
| 5,095,562 A | 3/1992 | Alexander |
| 5,105,486 A | 4/1992 | Peterson |
| 5,199,534 A * | 4/1993 | Goff ..................... 16/35 R |
| 5,242,035 A | 9/1993 | Lange |
| 5,257,428 A | 11/1993 | Carroll et al. |
| 5,303,450 A | 4/1994 | Lange |
| 5,317,769 A | 6/1994 | Weismiller et al. |
| 5,347,682 A | 9/1994 | Edgerton, Jr. |
| 5,404,603 A | 4/1995 | Fukai et al. |
| 5,438,723 A | 8/1995 | Carroll |
| 5,519,916 A * | 5/1996 | Mainard .................... 16/35 R |
| 5,544,375 A | 8/1996 | Urness et al. |
| 5,636,394 A | 6/1997 | Bartley |
| 5,653,096 A | 8/1997 | Edwards |
| 5,669,090 A | 9/1997 | Basgall |
| 5,720,059 A | 2/1998 | Allevato et al. |
| 5,720,079 A * | 2/1998 | Yang ......................... 16/35 R |
| 5,878,452 A | 3/1999 | Brooke et al. |
| 6,163,924 A | 12/2000 | Ward, Jr. et al. |
| 6,230,344 B1 | 5/2001 | Thompson et al. |
| 6,240,713 B1 | 6/2001 | Thomas |
| 6,321,878 B1 | 11/2001 | Mobley et al. |
| 6,357,065 B1 | 3/2002 | Adams |
| 6,405,393 B1 | 6/2002 | Megown |
| 6,453,508 B1 * | 9/2002 | Denner ..................... 16/35 R |
| 6,516,479 B1 | 2/2003 | Barbour |
| 2001/0047547 A1 | 12/2001 | Paul |
| 2003/0033672 A1 | 2/2003 | Jehn |

OTHER PUBLICATIONS

"Experience & Technology for the 21st Century", Faultless Catalog 2200.

* cited by examiner

Primary Examiner—Frederick L. Lagman

(57) ABSTRACT

A directional lock for a caster. The caster has a wheel assembly including a wheel rotatable about a wheel axis and a housing for supporting the wheel. The housing defines a cavity for receiving a portion of the wheel. Also, the caster includes a stem supported by the housing and positionable in a chassis element, the wheel assembly being pivotally attached to the stem. The directional lock has an engagement portion and a base portion coupled to the engagement portion such that the engagement portion is movable relative to the base portion. The engagement portion is for engaging the wheel assembly to locate the wheel assembly in a predetermined position relative to the chassis element. The base portion is adapted to cooperate with the chassis element to maintain the engagement portion in a predetermined relation to the chassis element.

21 Claims, 19 Drawing Sheets

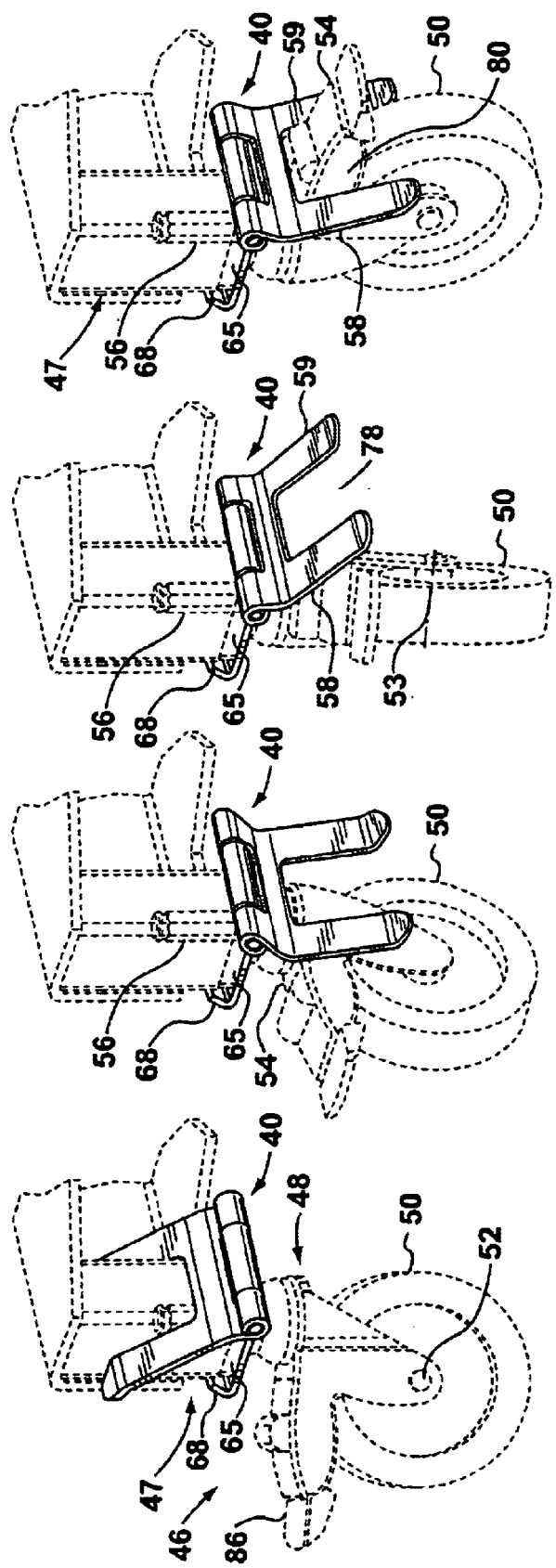

US 6,880,202 B2

DIRECTIONAL LOCK

FIELD OF THE INVENTION

This invention relates to directional locks for casters and, more particularly, directional locks for casters on an adjustable bed.

BACKGROUND OF THE INVENTION

The use of casters to facilitate the movement of equipment, for example, on adjustable beds for use in long-term care facilities or hospitals, is known. An typical adjustable bed includes a frame supported by legs. In a conventional adjustable bed, movement of the legs causes movement of the frame relative to a floor surface supporting the bed. The frame holds a mattress support on which a mattress is placed. Typical adjustable beds are disclosed in U.S. Pat. No. 4,097,939 (Peck et al.) and U.S. Pat. No. 6,230,344 (Thompson et al.).

The conventional adjustable bed extends between a head end and a foot end, and the legs extending towards the floor surface at the head end are typically supported above the floor surface by casters or rollers. For example, Thompson at al. discloses an adjustable bed in which the legs at the head end are supported by rollers. In known adjustable beds, the legs extending towards the floor surface at the foot end are often supported above the floor surface by feet, as disclosed in Thompson et al. However, it is also known that the legs extending towards the floor surface at the foot end may be supported by casters, as disclosed in Peck et al. Movement of the legs (i.e., to cause movement of the frame relative to the floor) can be cooperative or independent in known beds.

Substantially vertical movement of the frame (i.e., substantially straight up or down) is often required. In known adjustable beds, however, substantially vertical movement of the frame relative to the floor surface is accompanied by horizontal movement of the supporting legs at the casters or rollers, as the case may be, which support the legs on the floor surface. This is shown in FIG. 1, which is a side view of a prior art adjustable bed 30. (As will be described, the remainder of the drawings illustrate the present invention.)

As seen in FIG. 1, the prior art adjustable bed 30 includes a frame 31, and the adjustable bed 30 also has a head end 32 and a foot end 33. It will be understood that the other side (not shown) of the prior art adjustable bed is the same in all material respects as the side thereof shown in FIG. 1. The frame 31 is supported by legs 34, 35 which are supported on a floor surface 36 by rollers 37 and feet 38 respectively. Legs 34, 35 are moved in order to effect generally upward or downward movement of the frame 31 relative to the floor surface 36.

As indicated in FIG. 1, when the frame 31 is moved substantially downwardly, the rollers 37 are forced to move horizontally along the floor surface 36 to a position indicated at X. Because the legs 36 are supported on the floor surface 36 by feet 38, no horizontal movement takes place at the foot end 33.

In known adjustable beds, the horizontal movement of the casters or rollers on the floor surface resulting from vertical movement of the frame tends to result in simultaneous limited horizontal movement of the frame as well, as is well known in the art. For example, in paragraph 39 of U.S. Published Patent Application No. US2001/0047547 A1 (Paul), reference is made to horizontal movement of a bed frame resulting from, and simultaneously with, vertical movement of the frame.

It is desirable to minimize the floor area required for the operation of an adjustable bed (i.e., the "footprint"). The smaller the adjustable bed footprint, the larger the patient capacity of a health care facility. However, in known adjustable beds, the footprint tends to be larger than the bed frame due to horizontal movement of the frame during its vertical movement.

Directional locks for maintaining a wheel assembly of a caster in a predetermined position are known. A directional lock can be used, for example, for maintaining the wheel assembly of the caster in a position as the caster wheel rotates. Known directional locks are disclosed in U.S. Pat. No. 5,242,035 (Lange), U.S. Pat. No. 5,303,450 (Lange), U.S. Pat. No. 5,653,096 (Edwards), U.S. Pat. No. 6,240,713 (Thomas), and U.S. Pat. No. 6,321,878 (Mobley et al.). However, known directional locks typically include a mechanism inside a caster housing for controlling the direction of travel of the wheel assembly, so that the known directional locks are usually somewhat complex and relatively expensive.

Edwards discloses "a simple hand operated locking pin" which can be inserted into a caster wheel frame to lock the caster (col. 2, lines 36–39). However, in Edwards, the caster is required to be positioned to receive the locking pin before the locking pin can be moved by a user to engage with the caster.

There is therefore a need for an improved directional lock for a caster and, more particularly, an improved directional lock for a caster on an adjustable bed.

SUMMARY OF THE INVENTION

In a broad aspect of the present invention, there is provided a directional lock for a caster. The caster has a wheel assembly including a wheel rotatable about a wheel axis and a housing for supporting the wheel. The housing defines a cavity for receiving a portion of the wheel. Also, the caster includes a stem supported by the housing and positionable in a chassis element, the wheel assembly being pivotally attached to the stem. The directional lock has an engagement portion and a base portion coupled to the engagement portion such that the engagement portion is movable relative to the base portion. The engagement portion is for engaging the wheel assembly to locate the wheel assembly in a predetermined position relative to the chassis element. The base portion is adapted to cooperate with the chassis element to maintain the engagement portion in a predetermined relation to the chassis element.

In another aspect, the invention provides an adjustable bed to be positioned on a floor. The adjustable bed has a primary frame for supporting a mattress frame and leg assemblies attached to the primary frame, for supporting the primary frame and moving the primary frame relative to the floor. Each leg assembly includes a chassis element. The bed also includes casters supporting leg assemblies above the floor. Each caster has a wheel assembly positioned including a wheel rotatable about a wheel axis, and a housing for supporting the wheel axis, the housing defining a cavity for receiving a portion of the wheel. Each caster also includes a stem supported by the housing. The wheel assembly is pivotally attached to the stem. The stem is positioned in the chassis element. Each caster is operatively connected with a directional lock. Also, each directional lock has an engagement portion and a base portion coupled to the engagement portion such that the engagement portion is movable relative to the base portion. The engagement portion is for engaging the wheel assembly to locate the wheel assembly in a predetermined position relative to the chassis element. The base portion is adapted to cooperate with the chassis element to maintain the engagement portion in a predetermined relation to the chassis element.

In another alternative aspect, the directional lock includes a guide element for locating the wheel assembly in a predetermined position relative to the chassis element. The guide element is positioned outside the housing and adapted for engagement with the wheel assembly. The wheel assembly and the guide element are adapted to cooperate with each other so that the wheel assembly is pivotable about the stem to the predetermined position.

In another alternative aspect, there is provided an adjustable bed having a primary frame for supporting a mattress frame, a first pair of leg assemblies coupled to the primary frame at a foot end of the primary frame, and a second pair of leg assemblies coupled to the primary frame at the head end thereof. The first pair of leg assemblies and the second pair of leg assembles are adapted to cooperate to support the primary frame above a floor surface and to move the primary frame relative to the floor surface. The first pair of leg assemblies includes a pair of legs, a chassis element, and a pair of follower bars. Each leg has a proximal end pivotally coupled to the primary frame, and a distal end pivotally coupled to the chassis element and spacing the chassis element apart from the primary frame. Each follower bar is pivotally coupled to the primary frame at a first end thereof and pivotally coupled to the chassis element at a second end thereof. The first end of each follower bar and the proximal end of each leg are spaced apart a first predetermined distance in substantially vertical relation to each other. Also, the second end of each follower bar and the proximal end of each leg are spaced apart a second predetermined distance in substantially vertical relation to each other. In addition, the first predetermined distance and the second predetermined distance are substantially the same. Each leg and each follower bar respectively cooperate with each other to maintain the chassis element in a substantially vertical position as the primary frame is moved relative to the floor surface. The adjustable bed includes casters with stems secured in the chassis elements of the first leg assemblies. Also, the adjustable bed includes directional locks positioned adjacent to the casters respectively, so that each directional lock's engagement portion is engageable with each respective caster's wheel assembly.

BRIEF DESCRIPTION OF THE DRAWINGS

The invention will be better understood with reference to the drawings, in which;

FIG. 6 is an isometric view of the directional lock of FIG. 2, drawn at a smaller scale, showing a caster including a wheel assembly and the base portion of the directional lock positioned adjacent to the wheel assembly and the engagement portion positioned in a disengaged state;

FIG. 7 is an isometric view of the directional lock of FIG. 6 showing the engagement portion in an intermediate state;

FIG. 8 is an isometric view of the directional lock of FIG. 6 showing the engagement portion in the intermediate state and partially supported by the wheel assembly;

FIG. 9 is an isometric view of the directional lock of FIG. 6 showing the engagement portion in the engaged state:

DETAILED DESCRIPTION OF THE PREFERRED EMBODIMENT(S)

Figure 1:
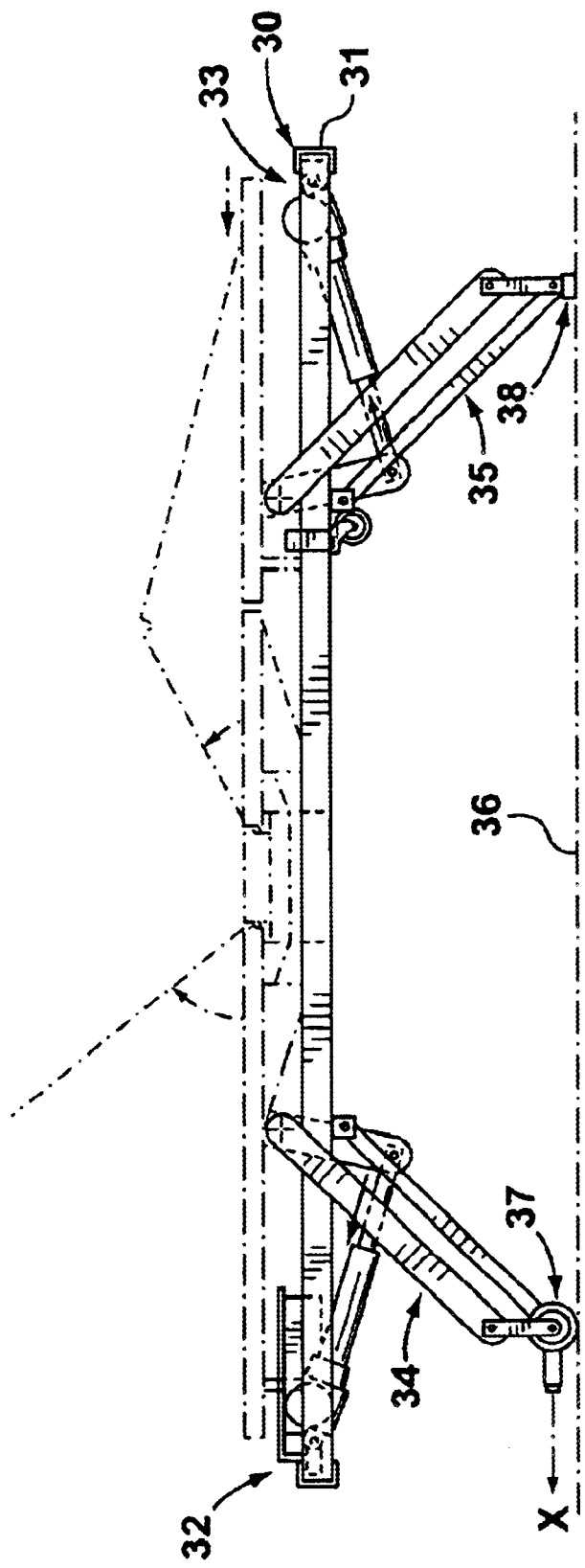
FIG. 1 (also described previously) is a side view of a prior art adjustable bed.
Figure 2:
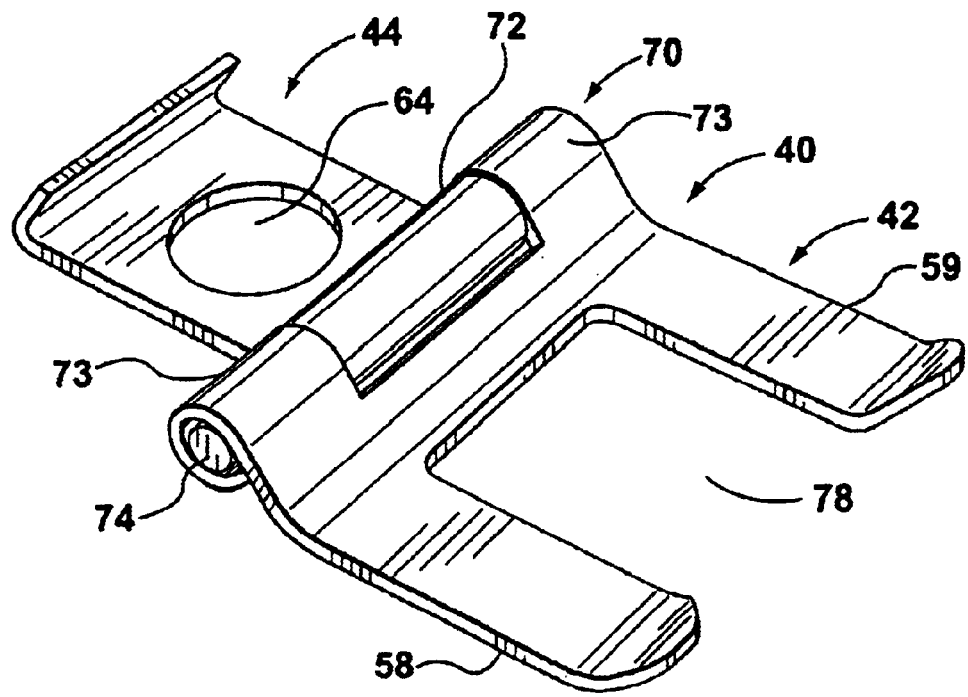
FIG. 2 is an isometric view of a preferred embodiment of the directional lock from the front and the top thereof, showing a base portion and an engagement portion coupled to each other, drawn at a larger scale.

Reference is first made to FIGS. 2–9 to describe a preferred embodiment of a directional lock indicated generally by the numeral 40 in accordance with the invention. As can be seen in FIGS. 2–5, the directional lock 40 includes an engagement portion 42 and a base portion 44 coupled to the engagement portion 42 so that the engagement portion 42 is movable relative to the base portion 44, as will be described.

The directional lock 40 is shown in FIGS. 6–9 with a caster 46 and a chassis element 47, the caster 46 and the chassis element 47 being shown in dashed lines. The caster 46 has a wheel assembly 48 including a wheel 50 rotatable about a wheel axle 52 (FIG. 6) defining a wheel axis 53 (FIG. 8), as is known in the art. Also, the wheel assembly 48 includes a housing 54 for supporting the wheel axle 52. As is known in the art, the housing 54 defines a cavity for receiving a portion of the wheel 50. The caster 46 also includes a stem 56, and the wheel assembly 48 is pivotally attached to the stem 56, as is also known in the art. As can be seen in FIGS. 2–9, the stem 56 is positioned in the chassis element 47 which is part of a larger structure, such as an adjustable bed (not shown in FIGS. 6–9). The stem 56 is secured in the chassis element 47, as is known in the art. Typically, rotation of the stem 56 is not restrained while the stem 56 is positioned in the chassis element 47.

As can be seen in FIGS. 6–9, the engagement portion 42 is for engaging the wheel assembly 48 to locate the wheel assembly 48 in a predetermined position relative to the chassis element 47. In FIG. 9, the wheel assembly 48 is shown as being located in the predetermined position by the engagement portion 42. In the preferred embodiment, the base portion 44 is adapted to cooperate with the chassis element 47 to maintain the engagement portion 42 in a predetermined relation to the chassis element 47, as will be described.

In the preferred embodiment, the engagement portion 42 is movable between an engaged state (FIG. 9), in which the engagement portion 42 locates the wheel assembly 48 in the predetermined position, and a disengaged state (FIG. 6), in which the wheel assembly 48 is pivotable about the stem 56. As shown in FIG. 9, the engagement portion 42 maintains the wheel assembly 48 in the predetermined position by restraining the wheel assembly 48 from pivoting about the stem 56. In the preferred embodiment, the restraining of the wheel assembly 48 is by two tines 58, 59, positioned on opposite sides of the wheel housing 54. It will be appreciated by those skilled in the art, however, that various forms of engagement portion 42 could be employed for restraining the wheel assembly 48.

Preferably, the engagement portion 42 is movable between an intermediate state (FIGS. 7 and 8) and the engaged state (FIG. 9), and also between the intermediate state and the disengaged state (FIG. 6). The wheel assembly 48 and the engagement portion 42 are preferably adapted to cooperate with each other so that the wheel assembly 48 is pivotable about the stem 56 when the engagement portion 42 is in the intermediate state until the wheel assembly 48 is in the predetermined position. The engagement portion 42 is adapted to move from the intermediate state to the engaged state upon the wheel assembly 48 moving into the predetermined position. The wheel 50 is permitted to rotate about the wheel axis 53 while the engagement portion 42 is in each of the disengaged state, the intermediate state, and the engaged state unless a brake is applied.

Figure 23:
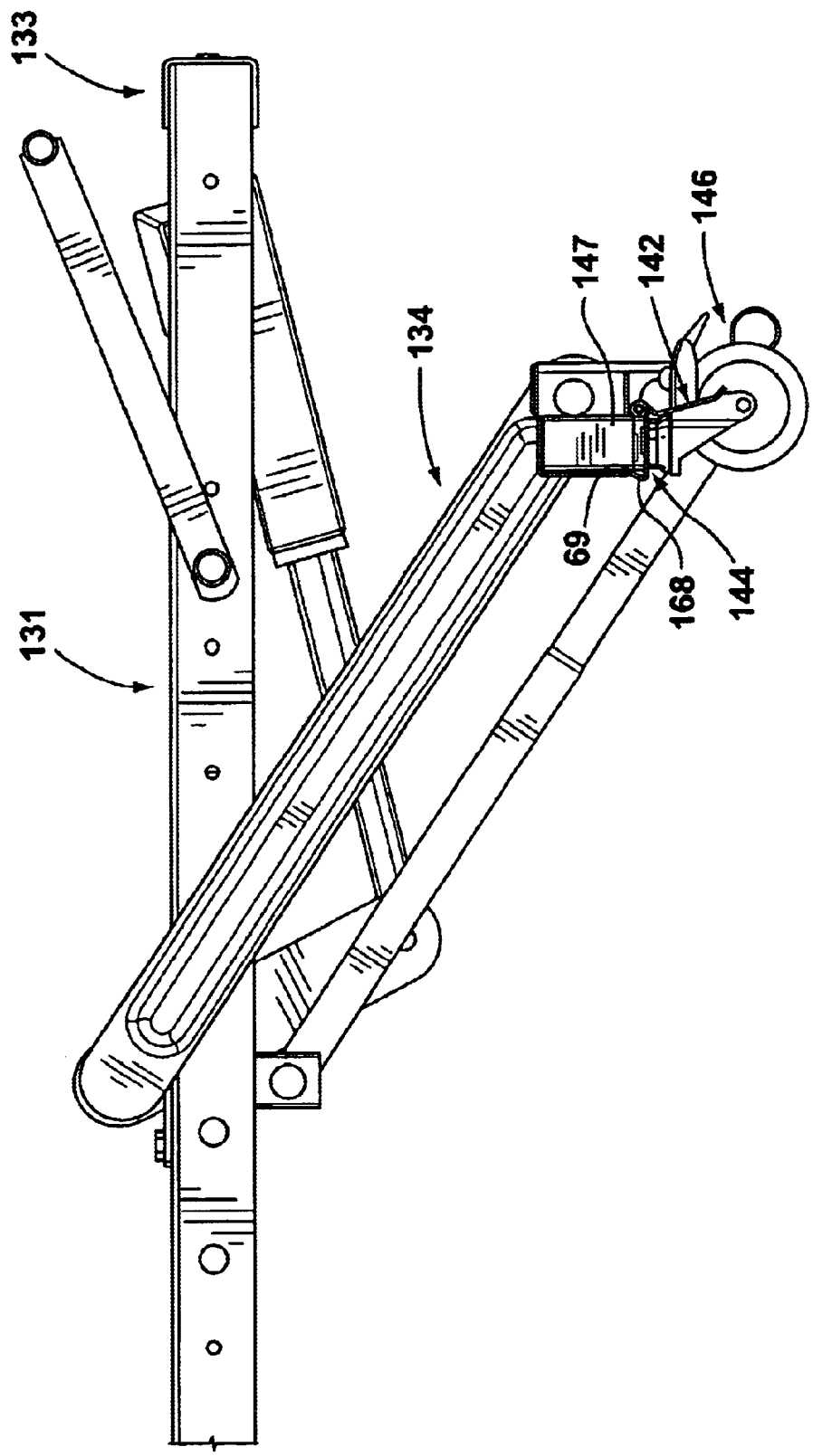
FIG. 23 is a side view of the foot end of the adjustable bed, drawn at a larger scale, showing the engagement portion of the directional lock in the engaged state and the adjustable bed frame in the fully raised position.
Figure 24:
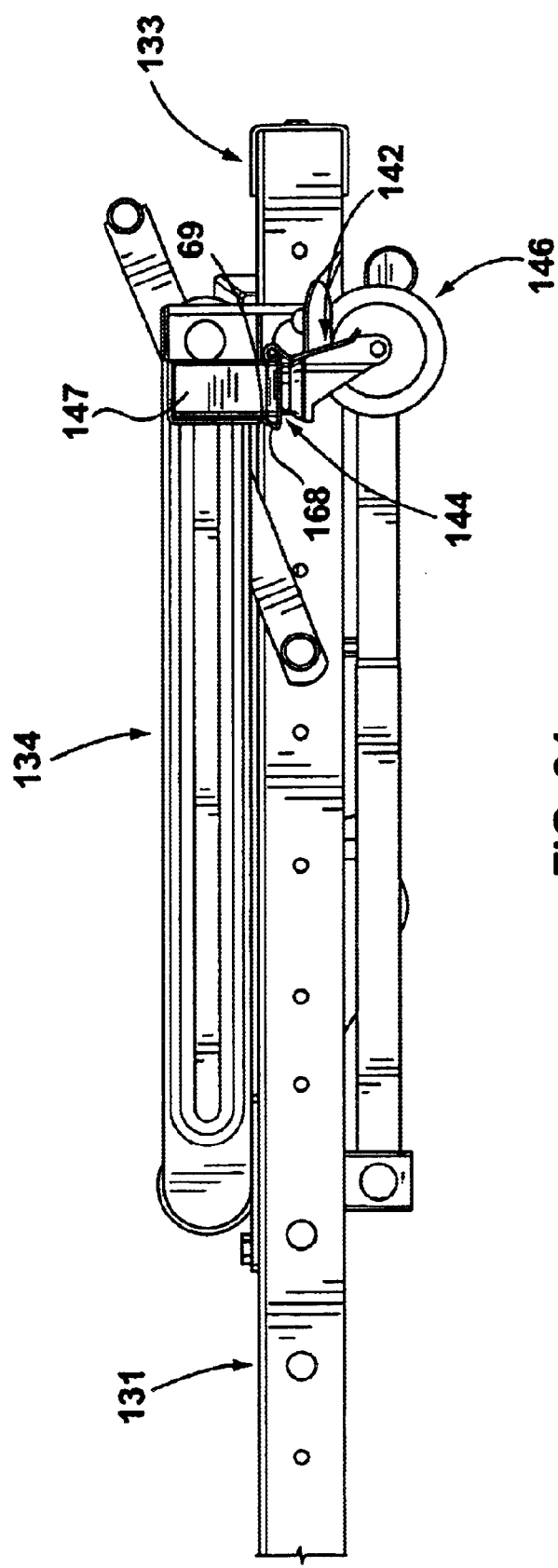
FIG. 24 is a side view of the foot end of the adjustable bed of FIG. 23 showing the frame in the fully lowered position.

As can be seen in FIGS. 2–5, the base portion 44 preferably includes an aperture 64 sized to receive the stem 56 (not shown in FIGS. 2–5). The base portion 44 is adapted to cooperate with a bottom part 65 of the chassis element 47 (FIGS. 6–9) to maintain the engagement portion 42 in the predetermined relation to the chassis element 47. The base portion 44 preferably includes a substantially smooth top surface 66 and an upwardly directed lip 68 positioned distal from the engagement portion 42 (FIGS. 2–9). As shown in FIGS. 6–9, the lip 68 is spaced apart from the engagement portion 42 so that the lip 68 is tightly engaged with a wall surface 69 (FIG. 23) of the chassis element 47 when the base portion 44 is in position, abutting the bottom part 65. As an example, the chassis element 47 can be a tube which is substantially square in cross-section and made of any suitable material, such as steel. As is known in the art, the bottom part 65 can include a substantially smooth flange or cap portion of a plastic tube insert secured in the chassis element 47 and used to secure the stem 56 in the chassis element 47. It will be appreciated that, in the embodiment of the directional lock 40 shown in FIGS. 2–9, the aperture 64 generally positions the directional lock 40 relative to the caster 46, and the lip 68 firmly secures the base portion 44 in tight engagement with the chassis element 47, thereby preventing movement of the base portion 44 relative to the chassis element 47.

FIGS. 2–5 also show that the engagement portion 42 and the base portion 44 are preferably pivotally coupled to each other by a hinge means 70 comprising a central portion 72 (forming part of the base portion 44), two end portions 73, and a hinge pin 74 located in the central portion 72 and the end portions 73. The hinge pin 74 permits the engagement portion 42 to pivot about a hinge axis 75 (FIG. 3) defined by the hinge pin 74.

Figure 3:
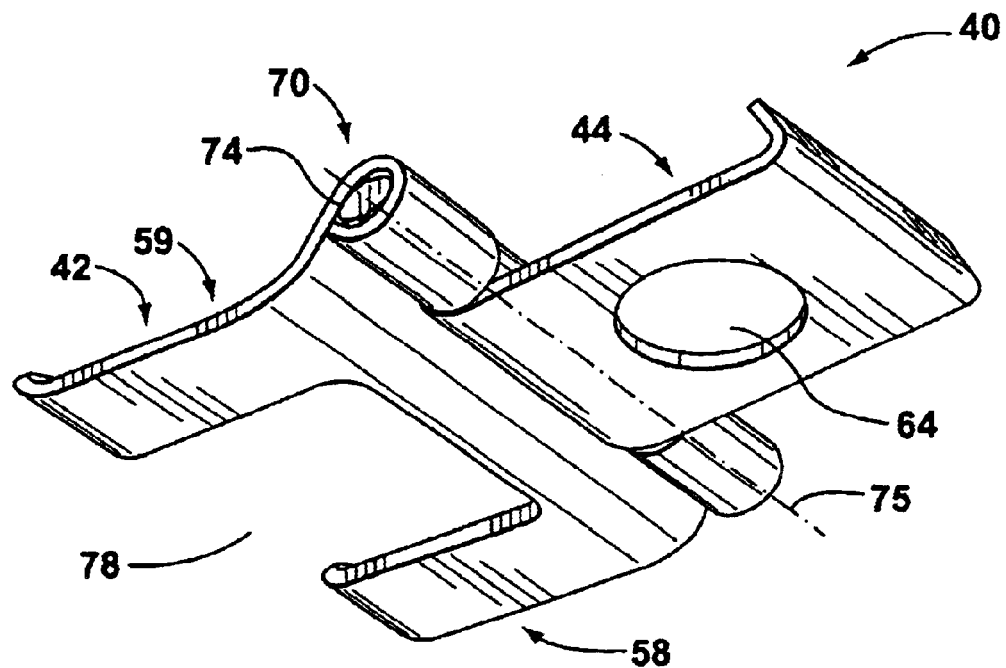
FIG. 3 is an isometric view of the back and the bottom of the directional lock of FIG. 2.
Figure 4:
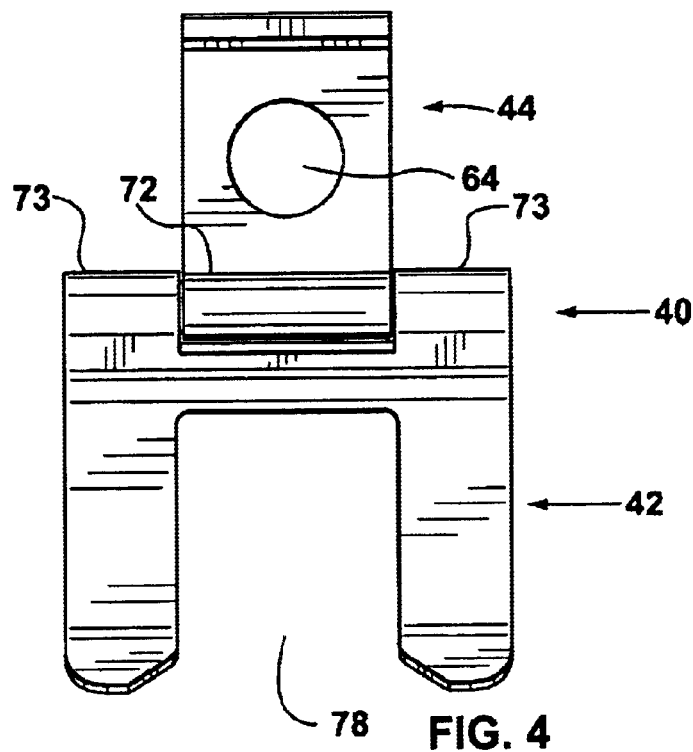
FIG. 4 is a top view of the directional lock of FIG. 2.
Figure 5:
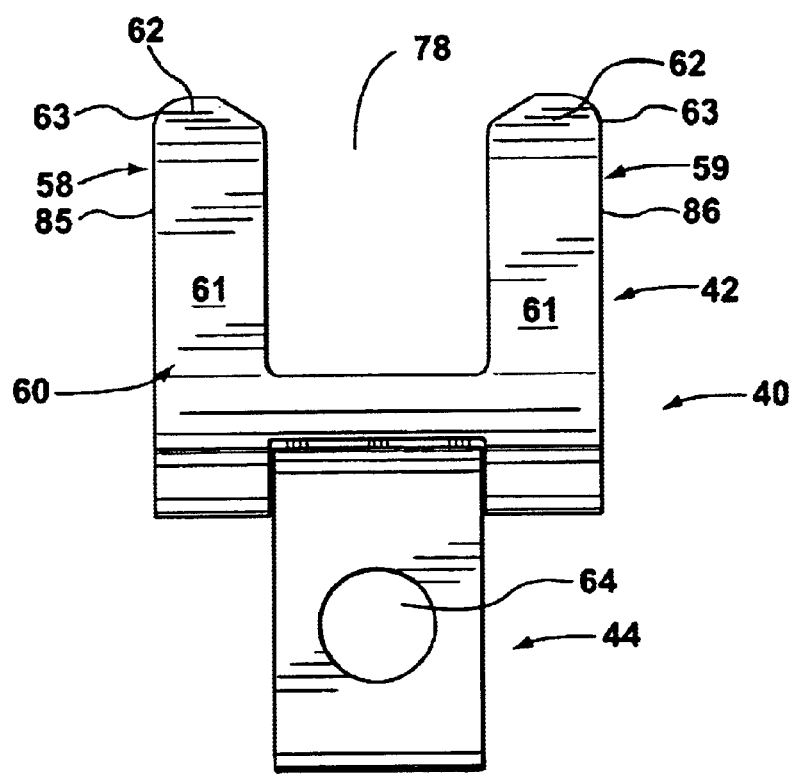
FIG. 5 is a bottom view of the directional lock of FIG. 2.

As shown in FIGS. 3 and 5, the base portion 44 includes a second lower surface 76 which preferably is curved upwardly towards the hinge means 70. The second lower surface 76 is configured in this way to facilitate movement of the engagement portion 42 relative to the base portion 44.

As shown in FIGS. 6–8, the engagement portion 42 moves from the disengaged state to the intermediate state when the engagement portion 42 pivots downwardly about the hinge pin 74. In the preferred embodiment, the tines 58, 59 define a slot 78 into which a segment portion 80 (FIG. 9) of the wheel assembly 48 is receivable. The tines 58, 59 and the slot 78 comprise a fork part 82 of the engagement portion 42.

As can be seen in FIGS. 6–9, when the engagement portion 42 is in the intermediate state, the engagement portion 42 is biased to the engaged state. It will be appreciated that, in the preferred embodiment, the engagement portion 42 is thus biased due to the force of gravity. When the engagement portion 42 is in the intermediate state (FIGS. 7 and 8), the wheel assembly 48 is pivotable about the stem 56 until the wheel assembly 48 is aligned with the slot 78. When the wheel assembly 48 is aligned with the slot 78, the segment portion 80 of the wheel assembly 48 is receivable in the slot 78, and the engagement portion 42 pivots about the hinge axis downwardly to position the tines 58, 59 on both sides of the wheel assembly 48. Because the engagement portion 42 is maintained in the predetermined relation to the chassis element 47 by the base portion 44, the tines 58, 59 restrain the wheel assembly 48 from pivoting about the stem 56.

It will be appreciated by those skilled in the art that the chassis element 47 can be included in a variety of movable equipment (not shown in FIGS. 2–9), and that in many cases, a predetermined position for a wheel assembly would preferably be the position which results in travel of the equipment in a direction substantially parallel to forward or backward movement of the equipment. In the preferred embodiment, the base portion 44 is positioned relative to the chassis element 47 so that the slot 78 is substantially aligned with the predetermined position of the wheel assembly 48. Preferably, this condition is met when the wheel axle 521 is substantially parallel with the hinge pin 74. In the preferred embodiment, therefore, the hinge pin 74 is positioned substantially orthogonal to the direction of forward or backward travel of the equipment.

As will be described in more detail, because of the directional lock 40, a caster 46 can be temporarily converted to use as a roller. Those skilled in the art will appreciate that casters are desirable where manoeuverability is required while rollers are desirable where stability and limited directional variation are required. For example, an item of movable equipment (not shown) can have four casters, i.e., if maximum manoeuverability is necessary or desirable. The equipment could also include two directional locks (i.e., on a front pair or a back pair of casters). When the engagement portions of the directional locks are engaged, the casters thereby affected function as rollers, rather than casters. The equipment can then be more easily steered. e.g., when it is moved along a hallway. Also, the equipment is not as easily moved when pushed from the side. As a further example, where the equipment has four directional locks, one for each caster, the equipment is very stable, i.e., it is resistant to force directed at the side of the equipment.

As shown in FIG. 6, the engagement portion 42 is preferably maintained in the disengaged state by gravity. The engagement portion 42 in the disengaged state can be leaned back against the chassis element 47, and the chassis element 47 is partly received in the slot 78.

Figure 22:
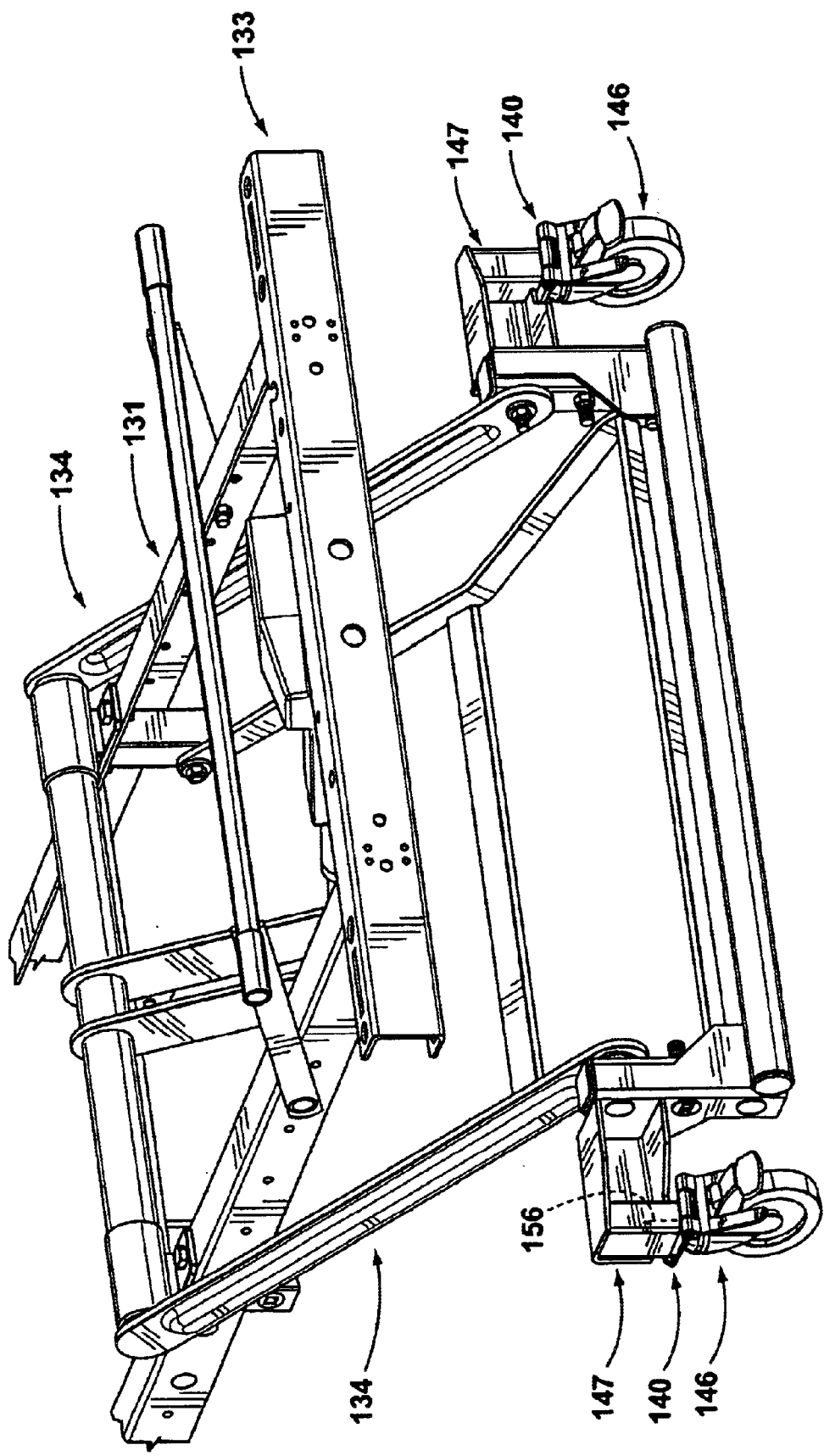
FIG. 22 is an isometric view of the foot end of the adjustable bed showing directional locks mounted with casters with engagement portions in the engaged state on each of the casters, drawn at a smaller scale.

The wheel assembly 48 can include a brake 86 (FIG. 6), as is known in the art. The brake 86 is movable between a locked condition, in which rotation of the wheel 50 about the wheel axle 52 is prevented, and a released condition, in which rotation of the wheel 50 about the wheel axle 52 is permitted. In FIGS. 6–9, the brake 86 is shown in the released condition. The brake 86 is shown in the locked condition in FIGS. 13, 22, and 23.

In use, in order to move the engagement portion 42 from the disengaged state to the engaged state, a user (not shown) flips the engagement portion 42 down from the disengaged state (FIG. 6) to the intermediate state (FIGS. 7 and 8), i.e., pivoting the engagement portion 42 downwardly about the hinge axis 75. The user moves the equipment including chassis element 47 about, to cause the wheel assembly 48 to pivot about the stem 56 until the wheel assembly 48 is substantially aligned with the slot 78, i.e., until the wheel assembly 48 is in the predetermined position. The segment portion 80 of the wheel assembly 48 is then received in the slot 78, and the engagement portion 42 is then in the engaged state (FIG. 9).

As can be seen in FIG. 5, the engagement portion 42 preferably has a lower surface 60 which is substantially smooth and is configured to cooperate with the housing 54 so that the lower surface 60 slidably engages the housing 54 when the engagement portion 42 is in the intermediate state. Because of this, the housing 54 can easily move relative to the lower surface 60 as the wheel assembly 48 pivots about the stem 56. The lower surface 60 includes main areas 61 and end areas 62 on end portions 63 (FIG. 5) positioned at the ends of the tines 58, 59 which are distal from the base portion 44. As can be seen in FIGS. 2–5, the end portions 63 are disposed at an angle to the plane defined by body portions 85, 86 of the tines 58, 59. This results in the end areas 62 being positioned at an angle relative to the main areas 61 (as shown in FIGS. 2–5). This facilitates movement of the housing 54 relative to the engagement portion 42, as this positioning enables the engagement portion 42 to ride up onto the housing 54 when the engagement portion 42 is in the intermediate state and the housing 54 is brought into contact with the lower surface (FIGS. 7 and 8). In the preferred embodiment, the end portions 63 are somewhat narrower than the body portions 85, 86 of the tines 58, 59 to further facilitate the engagement portion 42 riding up on the housing 54 as shown in FIGS. 7 and 8.

It will be appreciated by those skilled in the art that the caster 46 can be used as a caster, with the wheel assembly 48 rotatable about the stem 56, while the engagement portion 42 is in the disengaged state (FIG. 6). Also, when the engagement portion 42 is in the engaged state (FIG. 9), the caster 46 functions like a roller, in that the direction of travel of the wheel 50 is limited to that possible when the wheel assembly 48 is in the predetermined position. It will also be appreciated that a user (not shown) can conveniently cause the engagement portion 42 to move from the disengaged state to the engaged state by flipping the engagement portion 42 down, without regard to the position of the wheel assembly 48. If the wheel assembly 48 is not in the predetermined position when the engagement portion 42 is flipped down, then the engagement portion 42 is in the intermediate state. Movement of the chassis element 47 (i.e., due to movement of the equipment of which the chassis element 47 forms a part) to cause rotation of the wheel assembly 48 about the stem 56 ultimately moves the wheel assembly 48 to the predetermined position. As noted above, when the wheel assembly 48 is in the predetermined position, the engagement portion 42 moves to the engaged state.

It will also be appreciated by those skilled in the art that the engagement portion 42 can easily be flipped up by the user, to move the engagement portion 42 from the engaged state (or the intermediate state, as the case may be) to the disengaged state.

Additional preferred embodiments of the invention are shown in FIGS. 10–24. In FIGS. 10–24, elements are numbered so as to correspond to like elements shown in FIGS. 2–9.

Figure 10:
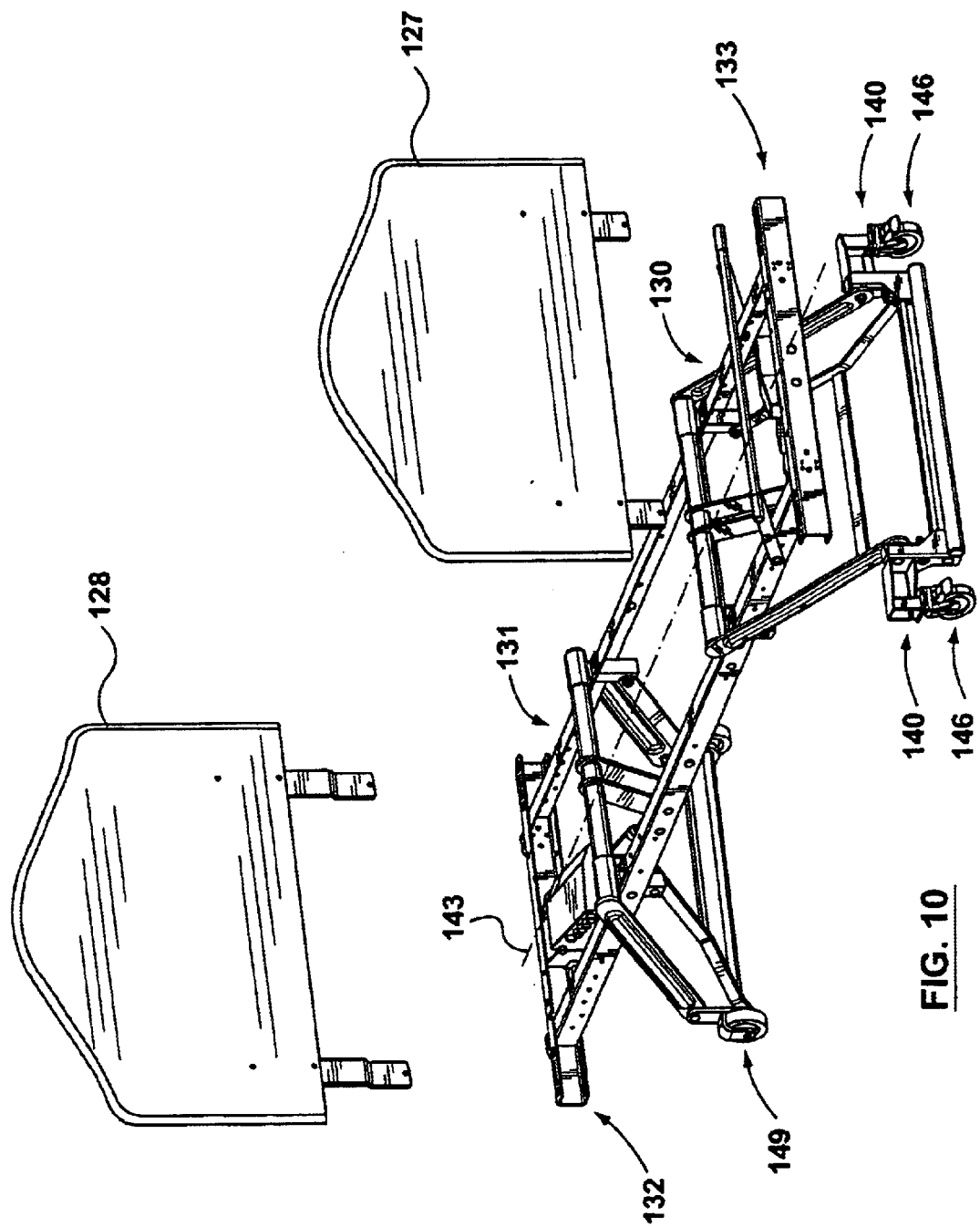
FIG. 10 is a partially exploded isometric view of a preferred embodiment of the adjustable bed including casters with the directional lock and a frame, from a foot end of the adjustable bed, drawn at a smaller scale.
Figure 11:
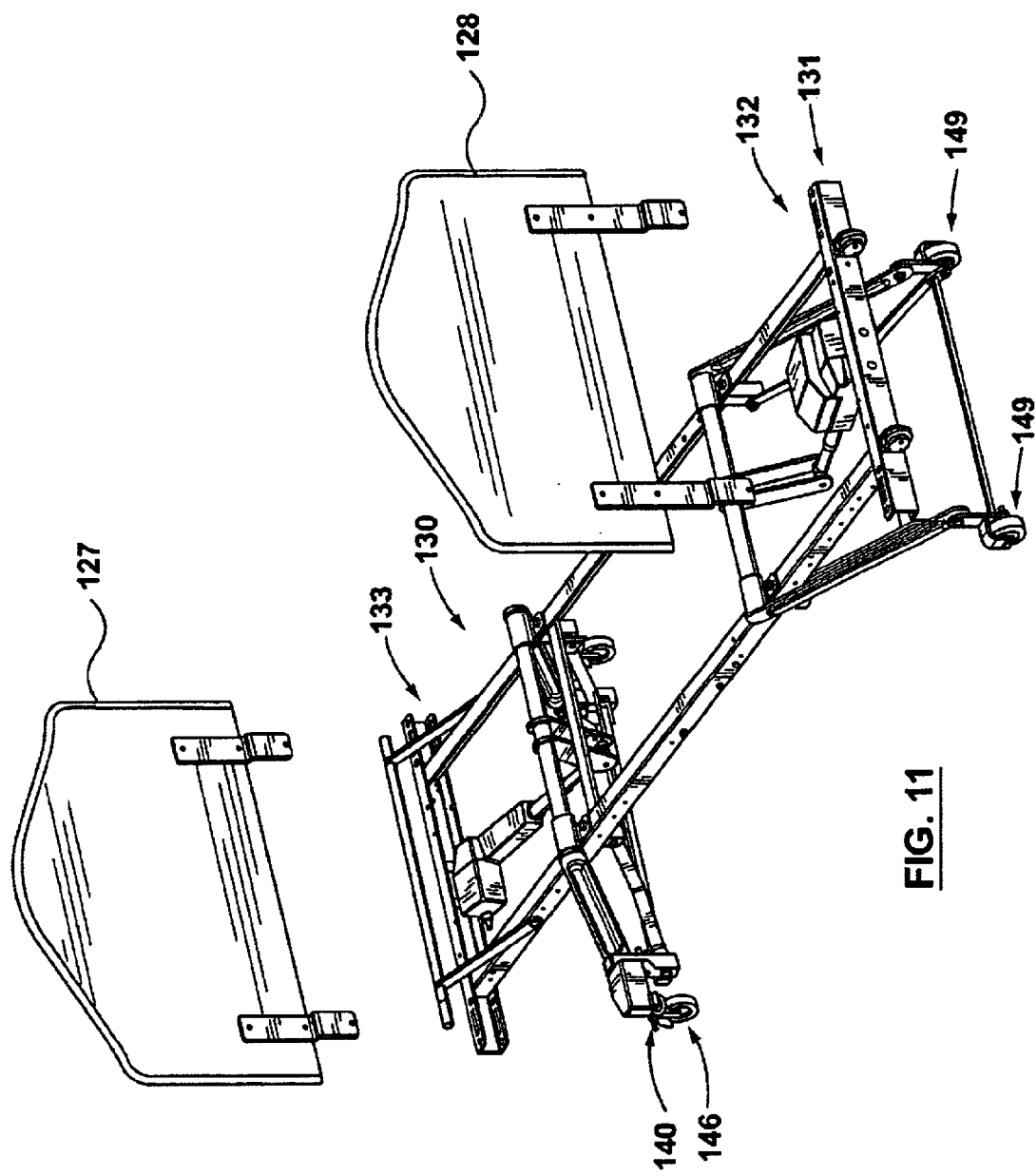
FIG. 11 is a partially exploded isometric view of the adjustable bed of FIG. 10, from a head end of the adjustable bed.
Figure 12:
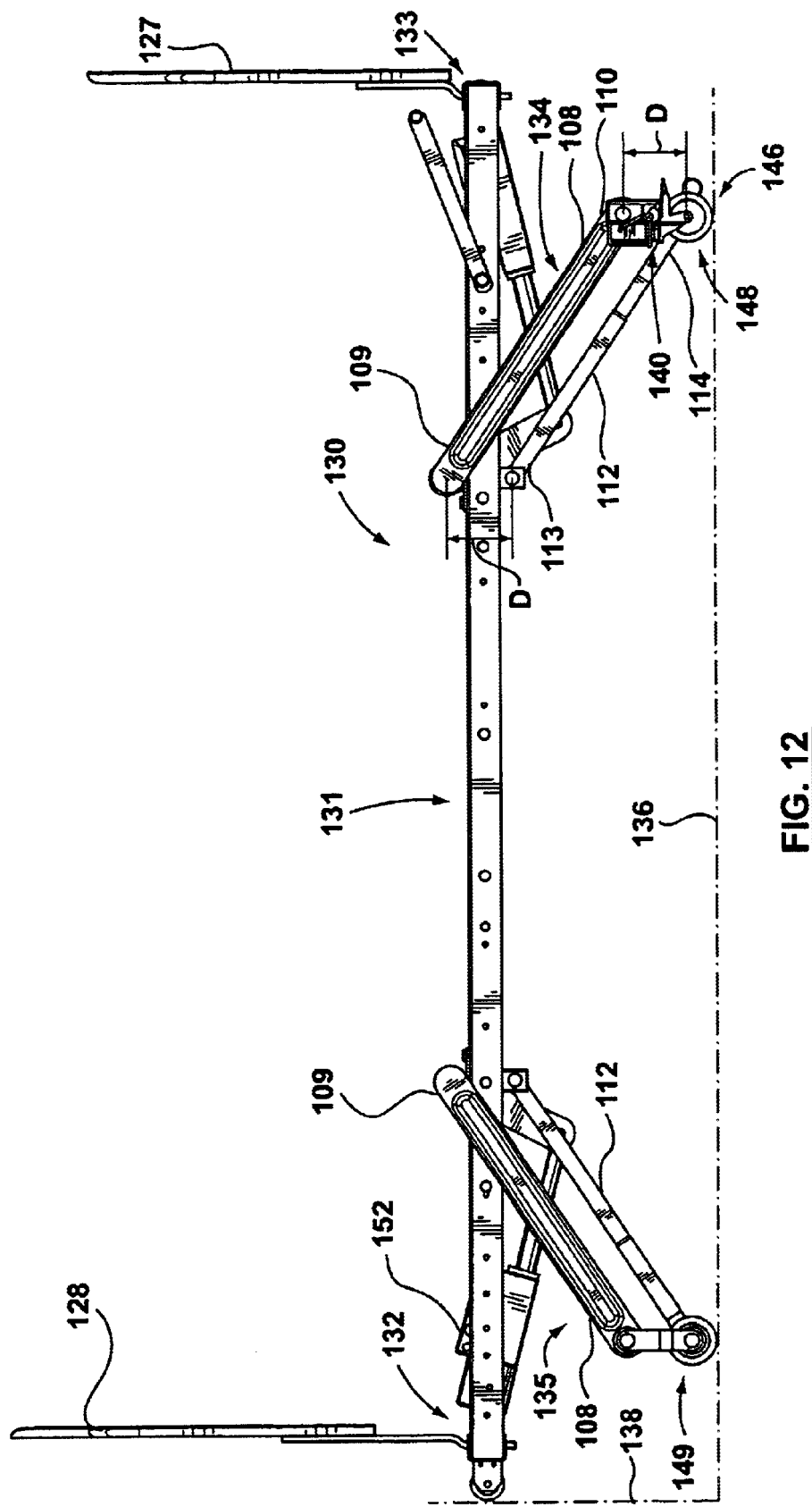
FIG. 12 is a side view of the adjustable bed of FIG. 10 in a fully raised position, drawn at a larger scale.

Referring to FIG. 10, a preferred embodiment of an adjustable bed is indicated generally by the numeral 130 in accordance with the invention. As can be seen in FIGS. 10 and 11, the adjustable bed 130 includes a primary frame 131, a pair of leg assemblies 134, and a second pair of leg assemblies 135 attached to the primary frame 131, for supporting the primary frame 131 and moving the primary frame 131 relative to a floor 136 (FIG. 12). The frame 131 has a head end 132 and a foot end 133.

Casters 146 including wheel assemblies 148 are attached to the leg assemblies 134 and are positioned so that the wheel assemblies 148 support the leg assemblies 134 on the floor 136. Rollers 149 support the leg assemblies 135 on the floor 136. The leg assemblies 134, 135 are adapted to move the primary frame 131 relative to the floor surface 136. Movement of the leg assemblies 134, 135 is caused by motive means 152, for example, linear actuators. As is known in the art, the motive means can be powered by electricity or use hydraulic or pneumatic power. Preferably, the leg assemblies 134, 135 can be moved independently of each other.

It will be appreciated that arrangements of casters other than those shown in the drawings could be used. For example, both of the leg assemblies could be used with casters. Alternatively, casters could be attached to the leg assembly 135 at the head end 134 and rollers could be attached to the leg assembly 134 at the foot end 133.

Each wheel assembly 148 is pivotally attached to a stem 156, and the stems 156 are attached to the chassis elements 147 which form part of the leg assemblies 134. The adjustable bed 130 includes directional locks 140. Preferably, each directional lock 140 is operatively associated with a caster 146.

Preferably, the directional lock 140 includes a base portion 144 and an engagement portion 142 coupled to the base portion 144 and movable relative to the base portion 144, as can be seen in FIGS. 16–21. Each engagement portion 142 is adapted for engagement with each respective wheel assembly 148, to locate the wheel assembly 148 in a predetermined position relative to the chassis element 147. The base portion 144 is adapted to cooperate with the chassis element 147 to maintain the engagement portion 142 in a predetermined relation to the chassis element 147. The engagement portion 142 is also movable between an engaged state (FIGS. 21, 22), in which the engagement portion 142 maintains the wheel assembly 148 in the predetermined position, and a disengaged state (FIGS. 16 and 17), in which the wheel assembly 148 is pivotable about the stem 156. The engagement portion 142 is shown in the intermediate state in FIGS. 18–20.

Referring to FIG. 12, the primary frame 131 is shown in a raised position relative to the floor 136, and the engagement portion 142 is in the disengaged state. The primary frame 131 is shown in a lowered position relative to the floor 136 in FIG. 13. It will be appreciated that, before the primary frame 131 is moved to the lowered position, the engagement portion 142 is moved from the disengaged state to the intermediate state, unless the wheel assembly 148 is already in the predetermined position. The wheel assembly 148 is rotated about the stem 156 until the wheel assembly 148 is in the predetermined position, as will be described. (In FIG. 12, only one side of the adjustable bed 130 is shown because the other side of the bed 130 is the same.) Preferably, the engagement portion 142 for each wheel assembly 148 is moved to the engagement state before the primary frame 131 is lowered.

Preferably, the leg assemblies 134 are coupled to the primary frame 131 at the foot end 133. Also, the leg assemblies 135 are coupled to the primary frame 131 at the head end 132 thereof, as can be seen in FIGS. 10 and 11. The first pair of leg assemblies 134 and the second pair of leg assemblies 135 are adapted to cooperate to move the primary frame 131 relative to the floor surface 136. Preferably, the leg assemblies 134, 135 each include legs 108. A proximal end 109 of each leg 108 is pivotally coupled to the primary frame 131, and a distal end 110 is pivotally coupled to the chassis element 147. The adjustable bed 130 also includes a follower bar 112 operatively associated with each leg 108 respectively. A first end 113 of each follower bar 112 in the leg assemblies 134 is pivotally coupled to the primary frame 131, and a second end 114 of each follower bar 112 in the leg assemblies 134 is pivotally coupled to the chassis element 147. As can be seen in FIG. 12, each proximal end 109 and each respective first end 113 are spaced apart a distance "D" which is substantially the same as the distance "D" by which each distal end 110 and each respective second end 114 are also separated. Furthermore, each proximal end 109 and respective first end 113, are positioned in a substantially vertical relation to each other, as are each distal end 110 and each respective second end 114.

It can be seen from FIG. 12 that, in the preferred embodiment, each follower bar 112 is positioned substantially parallel to each leg 108 respectively. However, the follower bars 112 need not be parallel along their lengths thereof to the legs 108 respectively. Because of the positioning of each proximal end 109 and each first end 113 and each distal end 110 and each second end 114, each leg 108 and each follower bar 112 respectively cooperate with each other to maintain the chassis element 147 in a substantially vertical position as the primary frame 131 is moved relative to the floor 136.

Figure 14:
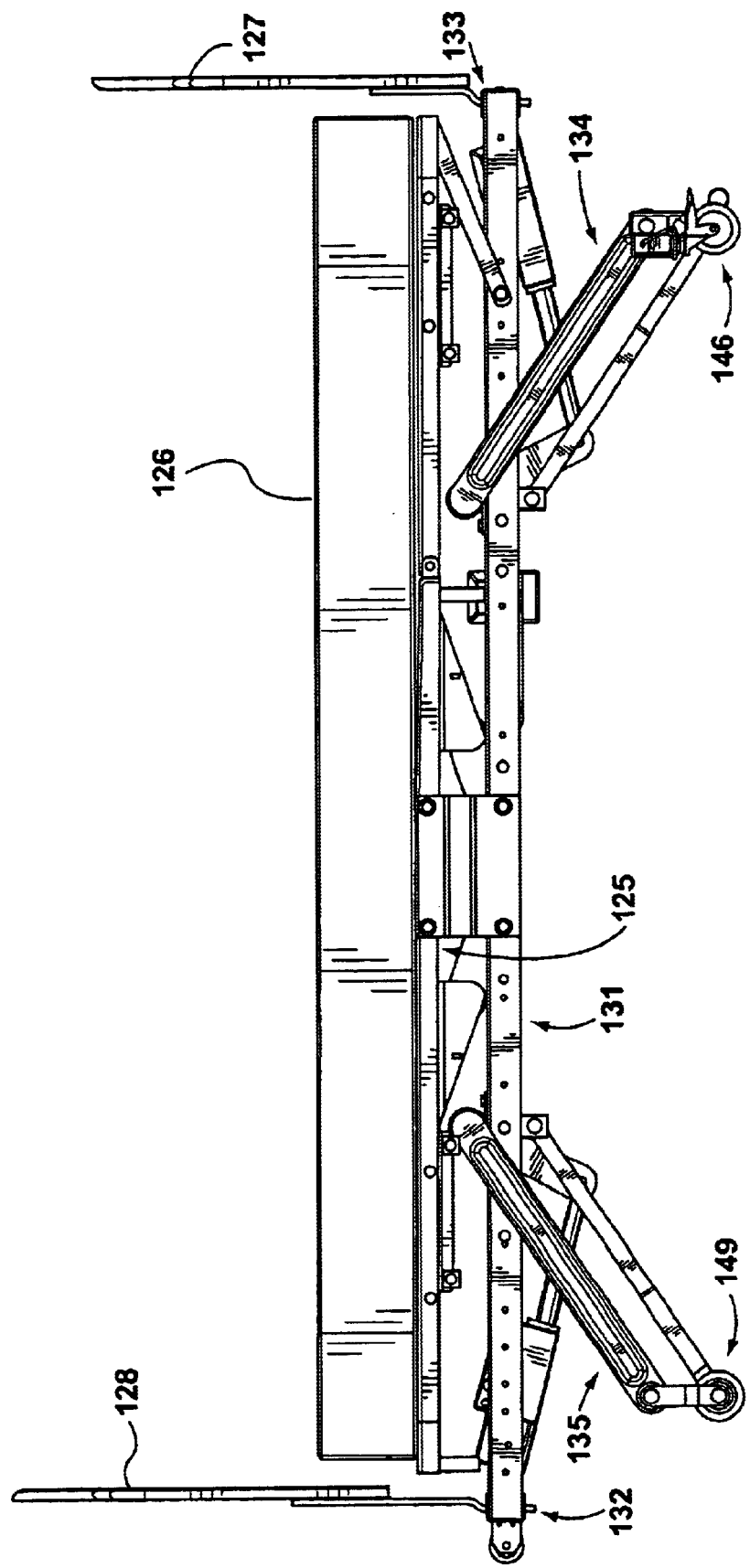
FIG. 14 is a side view of the adjustable bed of FIG. 12 in a fully raised position, including a mattress support, a mattress, and a headboard and a footboard positioned on the frame.
Figure 15:
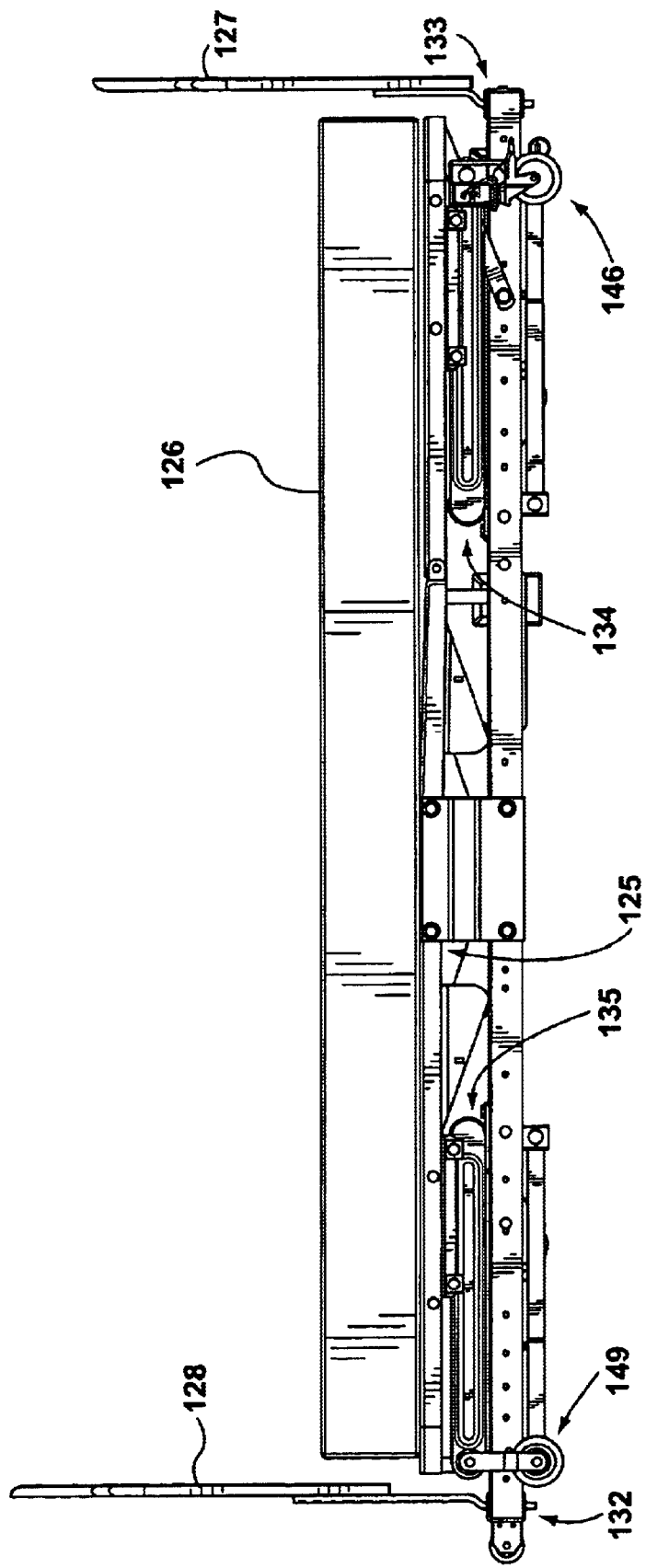
FIG. 15 is a side view of the adjustable bed of FIG. 14, in the fully lowered position.
Figure 16:
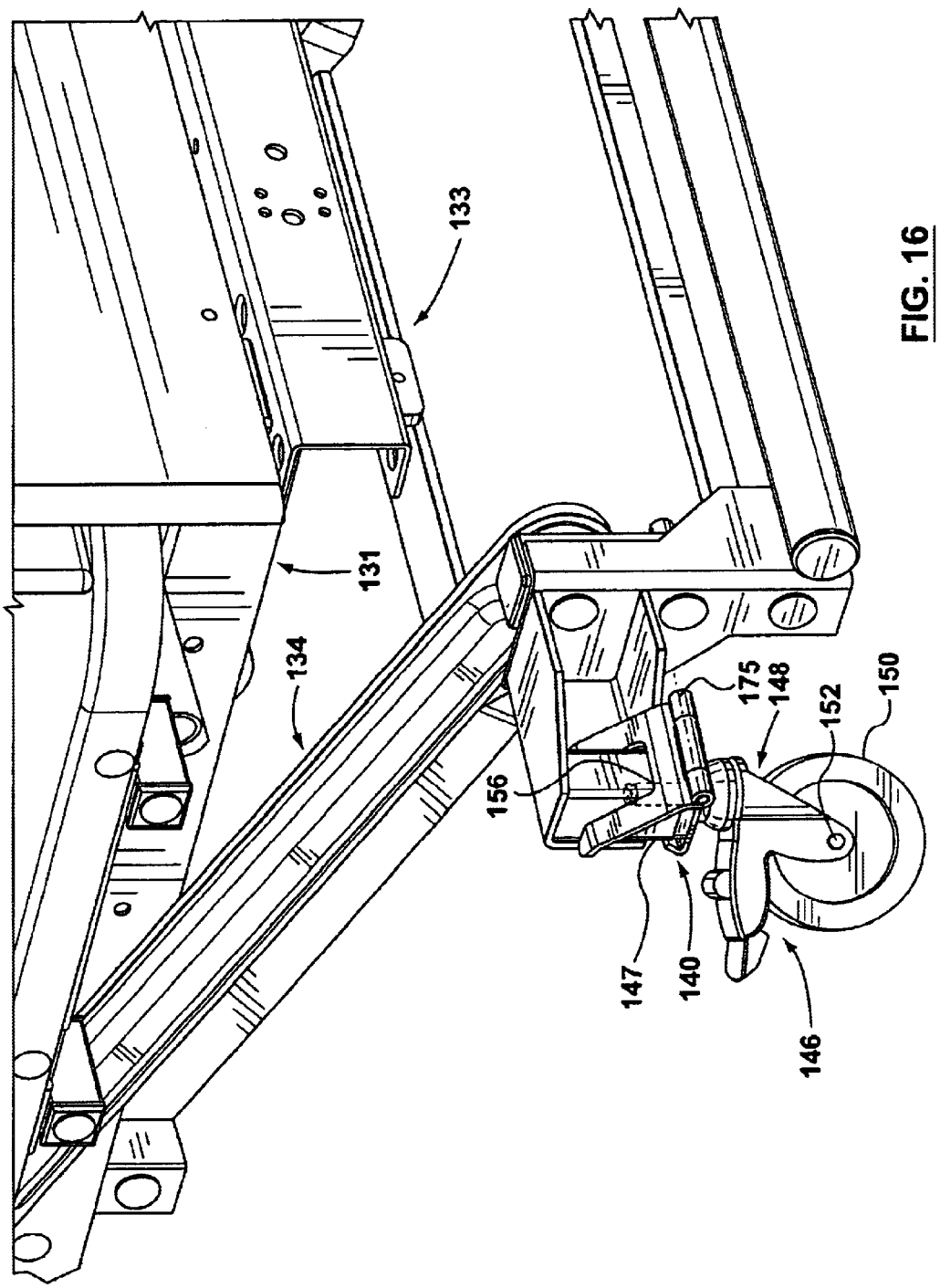
FIG. 16 is an isometric view of the directional lock and a caster on the adjustable bed of FIG. 10, the caster including a wheel assembly, showing the base portion of the directional lock positioned adjacent to the wheel assembly and the engagement portion in the disengaged state, drawn at a larger scale.
Figure 17:
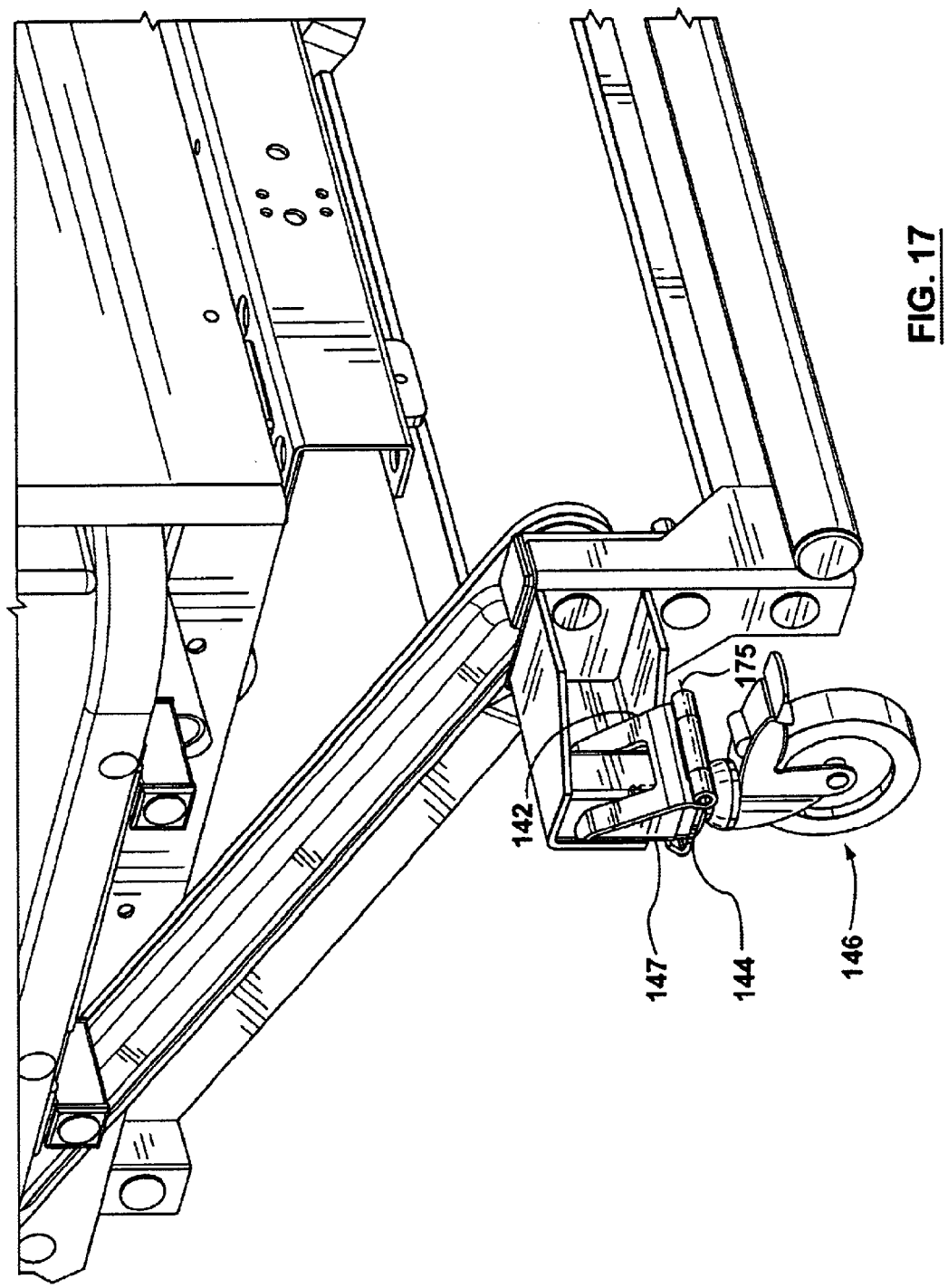
FIG. 17 is an isometric view of the directional lock and caster of FIG. 16 in which the engagement portion is in the disengaged state.
Figure 18:
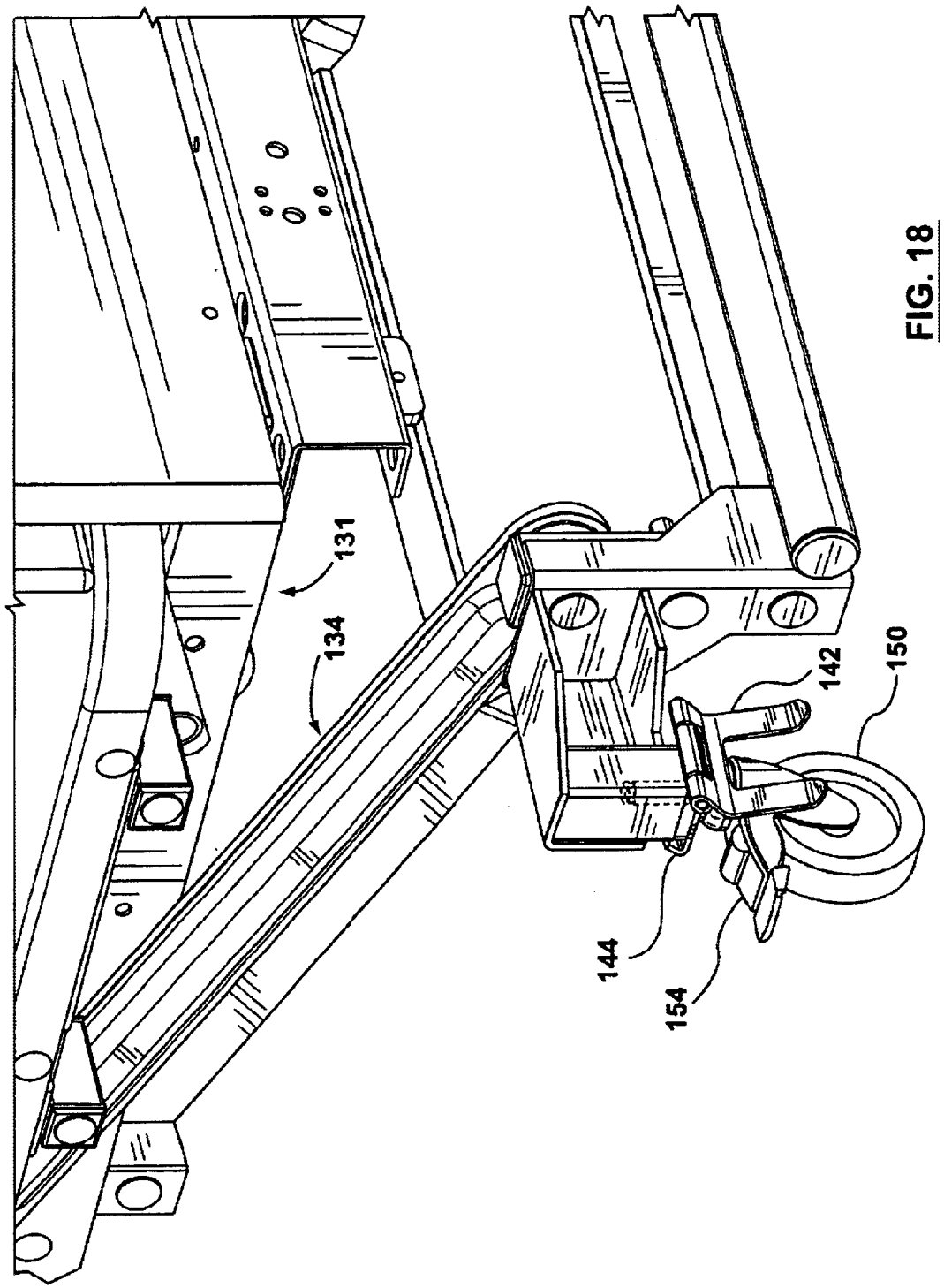
FIG. 18 is an isometric view of the directional lock and caster of FIG. 16 in which the engagement portion is in the intermediate state.
Figure 19:
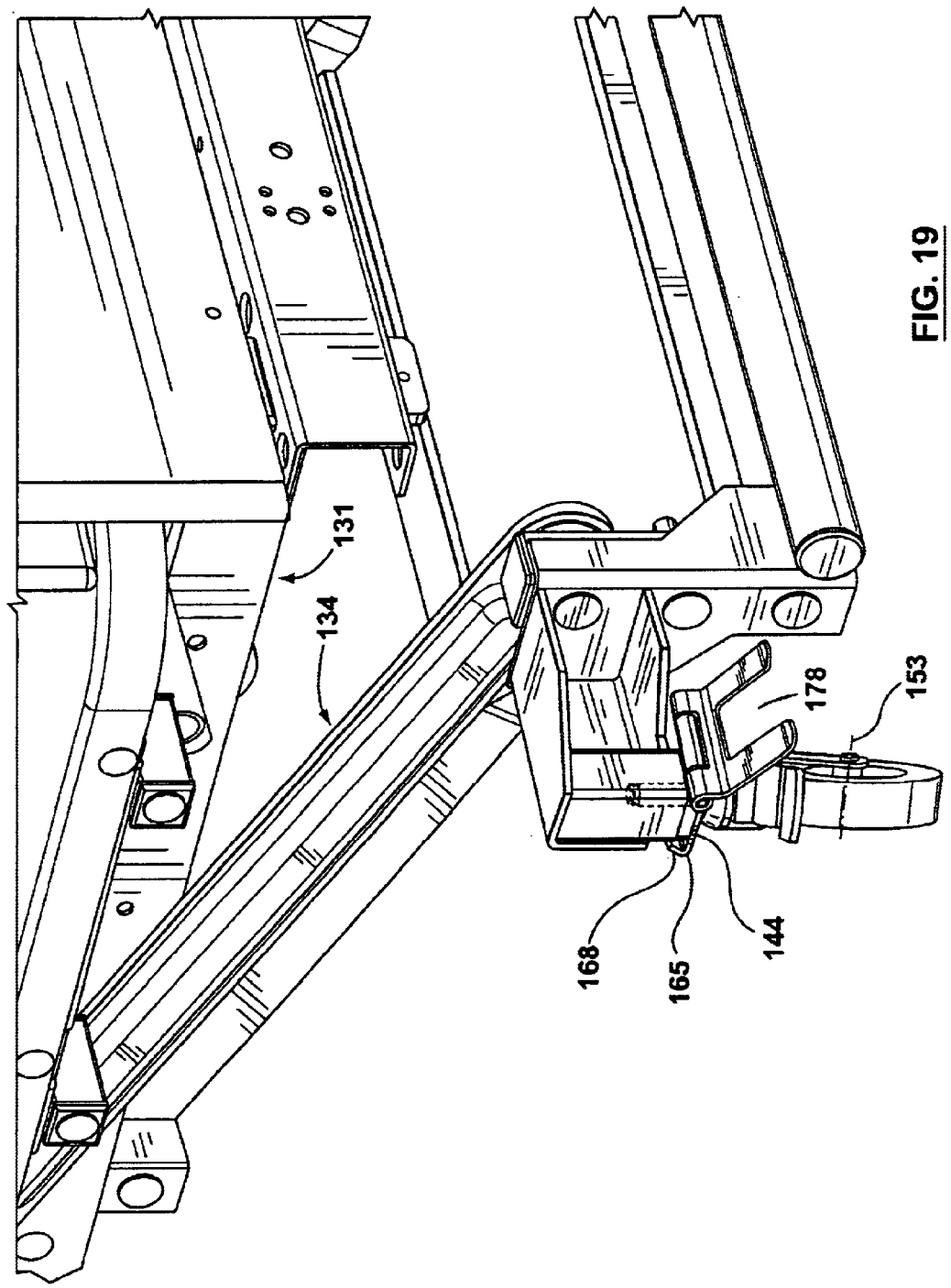
FIG. 19 is an isometric view of the directional lock and the caster of FIG. 16 in which the engagement portion is in the intermediate state.
Figure 20:
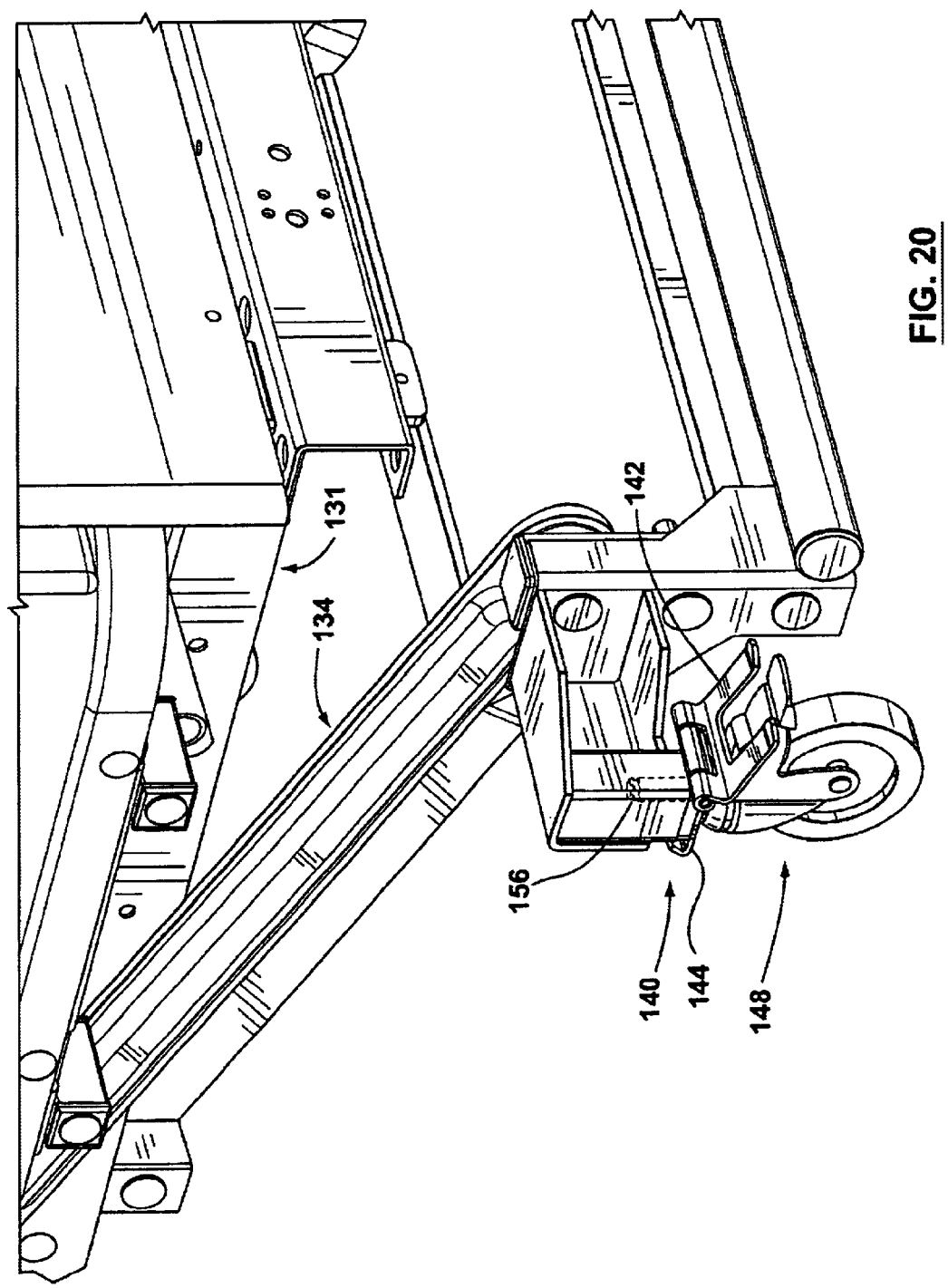
FIG. 20 is an isometric view of the directional lock and the caster of FIG. 16 in which the engagement portion is in the intermediate state.
Figure 21:
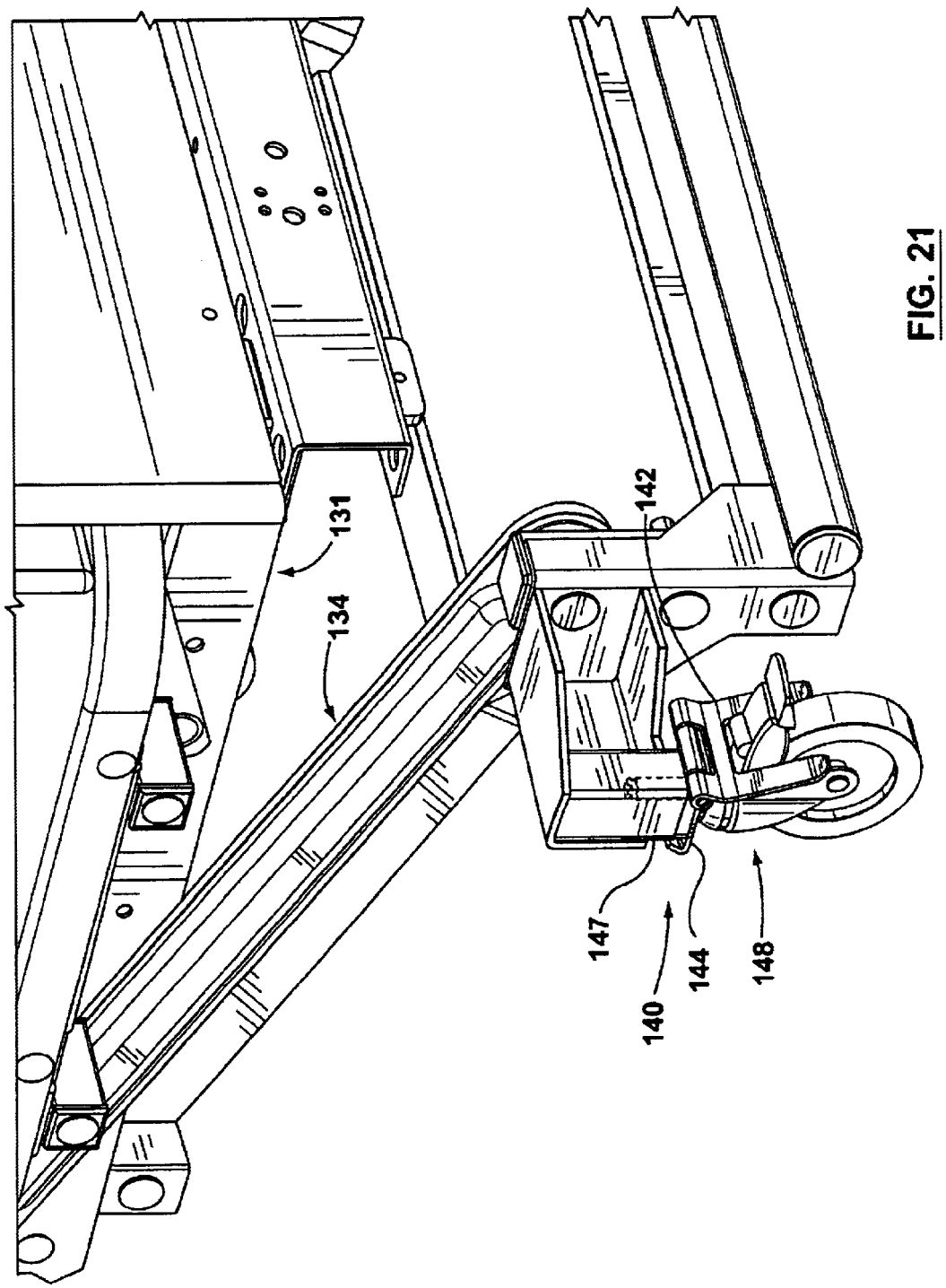
FIG. 21 is an isometric view of the directional lock and the caster of FIG. 16 in which the engagement portion is in the engaged state.

As can be seen in FIGS. 14 and 15, the primary frame 131 supports a mattress frame 125, which supports a mattress 126. Typically, the mattress frame 125 can be arranged in a number of "Trendelenburg positions", as is known. Preferably, the primary frame 131 also supports a foot board 127 and a head board 128.

Preferably, the base portion 144 cooperates with the chassis element 147 such that the predetermined relation is defined by the direction in which the engagement portion 142 pivot about the hinge axis 75. In the preferred embodiment, such direction is substantially parallel to a longitudinal axis 143 of the frame 131 (FIG. 10).

Figure 13:
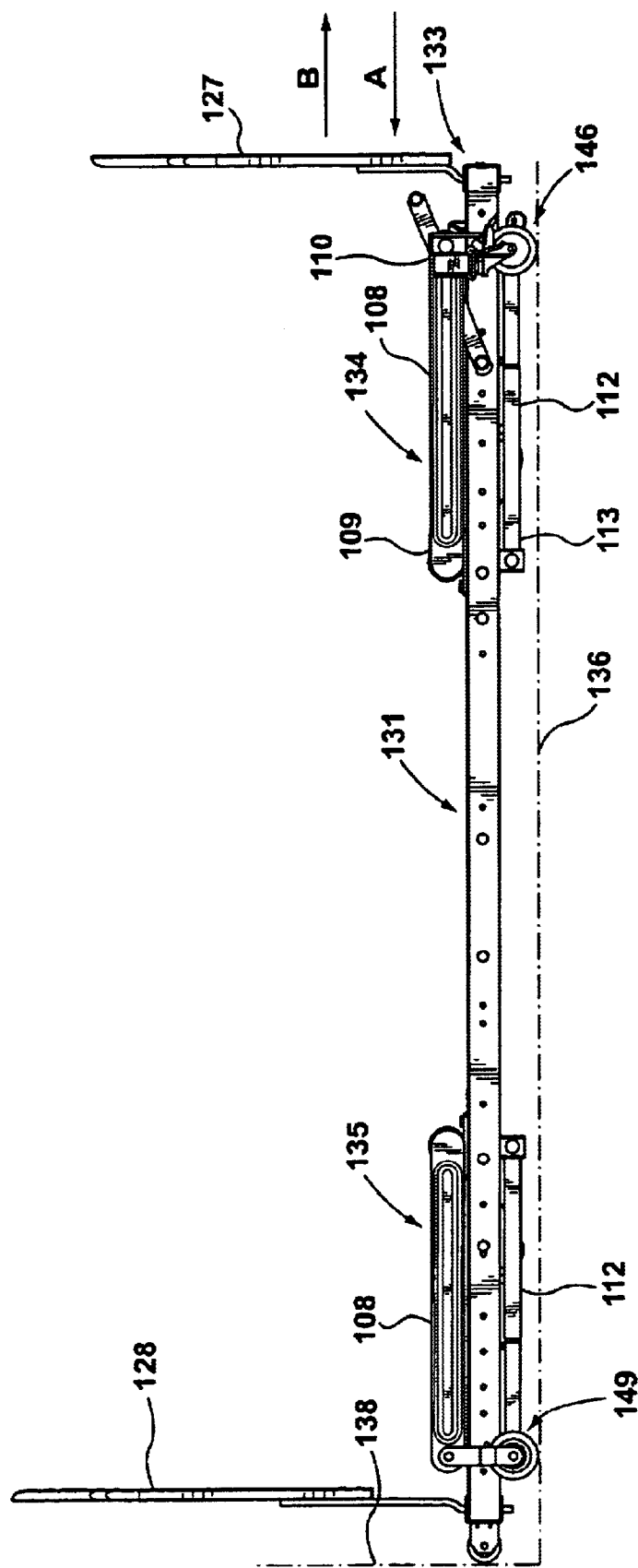
FIG. 13 is a side view of the adjustable bed of FIG. 12, in a fully lowered position.

In use, as the primary frame 131 is lowered, horizontal movement of the rollers 149 and the casters 146 on the floor surface 136 results. In order to minimize horizontal movement of the primary frame 131, a user (not shown) moves the engagement portions 142 of the directional locks 140 to the engaged state, thereby locking the wheel assemblies 148 in the predetermined positions, which are substantially parallel to the longitudinal axis 143. The rollers 149 are also positioned so that they can roll in a direction which is substantially parallel to the longitudinal axis 143. It can be seen in FIGS. 12 and 13 that the alignment of the wheel assemblies 148 with the longitudinal axis 143 of the primary frame 131 results in horizontal movement of the bed 130 on the floor 136 in a direction which is parallel to the longitudinal axis 143, i.e., in the direction of arrow A or in the direction of arrow B (FIG. 13). The horizontal movement of the bed 130 which results from movement of the primary frame 131 relative to the floor 136 is thus limited to movement in a direction parallel to the longitudinal axis 143. Horizontal movement of the frame 131 resulting from movement of the frame 131 relative to the floor 136 is accordingly relatively easy for the user to control. Accordingly, the footprint of the bed 130 is relatively small.

As the frame 131 is moved relative to the floor 136, the rollers 149 and the caster wheels 50 roll on the floor surface 136 in a direction substantially parallel to the longitudinal axis 143, i.e., in the direction of arrows A or B (FIG. 13). The extent to which the floor surface 136 offers resistance to the rollers 149 and the caster wheels 50 affects the extent to which horizontal movement of the primary frame takes place at the head end 132 or the foot end 133. Also, if brakes 86 are locked, then only the rollers 140 will move on the floor surface 136 as the frame 131 moves relative to the floor surface 136.

For example, the user could position the adjustable bed 130 as shown in FIG. 12 (i.e. with the primary frame 131 in the fully raised position) and engage the engagement portions 142 with the wheel assemblies 148. Lowering the primary frame 131 results in movement of the rollers 149 and the caster wheels 50 in the direction of arrows A or B. The extent of movement of the rollers 149 and the caster wheels 50 depends on the extent of resistance to rolling encountered. By way of example, a floor surface 136 which is a carpet would offer more resistance than a tile floor. Also, force can be applied to a foot end 133 of the adjustable bed 130 in the direction shown by arrow A in FIG. 13 to cause the adjustable bed 130 to abut a wall 138.

Those skilled in the art will appreciate that the adjustable bed 130 is more stable when the engagement portions 142 are in the engaged state. When the engagement portions 142 are engaged, the bed 130 will be able to resist a force directed towards the bed from a direction transverse to the longitudinal axis 143. In practice, stability of the bed 130 is often important. Because of the directional lock 140, the bed 130 can have significant manoeuverability (i.e., when the engagement portions 142 are disengaged), or stability (i.e., when the engagement portions 142 are engaged), as required.

It will be appreciated by those skilled in the art that the directional lock 40 can readily be retrofitted on casters 46 with suitable wheel assemblies 48. The engagement portion 42 is configured to cooperate with most wheel assemblies 48. In view of the simple construction of the directional lock 40, modification of the engagement portion 42 and/or the base portion 44 to fit with various chassis elements and wheel assemblies would be relatively easy.

Those skilled in the art will also appreciate that casters are available in a wide variety of styles and that the directional lock would function with various types of casters. For example, casters are available which do not have stems. Typically, such a caster includes a plate (not shown) pivotally coupled to the wheel assembly instead of a stem. The plate is attached to a chassis element, and the directional lock could in this example be attached between the chassis element and the plate by suitable fasteners.

It will be evident to those skilled in the art that the invention can take many forms, and that such forms are within the scope of the invention as claimed. Therefore, the spirit and scope of the appended claims should not be limited to the description of the preferred versions contained herein.

We claim:

1. A directional lock for a caster, the caster having a wheel assembly including a wheel rotatable about a wheel axis and a housing supporting the wheel, and a stem supported by the housing and positionable in a chassis element, the wheel assembly being pivotally attached to the stem, the directional lock having:
   an engagement portion for engaging the wheel assembly to locate the wheel assembly in a predetermined position relative to the chassis element;
   a base portion coupled to the engagement portion such that the engagement portion is movable relative to the base portion.

2. A directional lock according to claim 1 in which the base portion has a top surface adapted to mate with a bottom part of the chassis element to maintain the base portion in the predetermined relation to the chassis element.

3. A directional lock for a caster, the caster having a wheel assembly including a wheel rotatable about a wheel axis and a housing supporting the wheel, and a stem supported by the housing and positionable in a chassis element, the wheel assembly being pivotally attached to the stem, the directional lock having:
   an engagement portion for engaging the wheel assembly to locate the wheel assembly in a predetermined position relative to the chassis element;
   a base portion coupled to the engagement portion such that the engagement portion is movable relative to the base portion;
   the base portion being adapted to cooperate with the chassis element to maintain the engagement portion in a predetermined relation to the chassis element; and
   the engagement portion being pivotally attached to the base portion by a hinge means including a hinge pin, the engagement portion being pivotable about a hinge axis defined by the hinge pin.

4. A directional lock according to claim 3 in which the engagement portion is positionable in the engaged state when the wheel axis is substantially parallel to the hinge axis and the wheel assembly is in the predetermined position relative to the chassis element.

5. A directional lock according to claim 4 in which the wheel assembly includes a brake mechanism movable between a locked condition, in which the brake mechanism prevents rotation of the wheel about the wheel axis, and a released condition, in which the brake mechanism permits the wheel to rotate about the wheel axis.

6. An adjustable bed to be positioned on a floor, the adjustable bed having:
   a primary frame for supporting a mattress frame;
   at least one leg assembly attached to the primary frame for supporting the primary frame and moving the primary frame relative to the floor, said at least one leg assembly including a chassis element;
   at least one caster including a wheel assembly having:
      a wheel rotatable about a wheel axis;
      a housing for supporting the wheel;
   said at least one caster including a stem supported by the housing;
   the wheel assembly being pivotally attached to the stem;
   the stem being positioned in the chassis element;
   said at least one caster supporting said at least one leg assembly above the floor; and
   at least one directional lock for said at least one caster, said at least one directional lock having:
      an engagement portion for engaging the wheel assembly to locate the wheel assembly in a predetermined position relative to the chassis element;
      a base portion coupled to the engagement portion, the engagement portion being movable relative to the base portion between an engaged state, in which the engagement portion maintains the wheel assembly in the predetermined position, and a disengaged state, in which the wheel assembly is pivotable about the stem;
      the engagement portion being movable between an intermediate state and the engaged state and between the intermediate state and the disengaged state, the engagement portion being biased to the engaged state when the engagement portion is in the intermediate state;
      the wheel assembly and the engagement portion being adapted to cooperate with each other such that the wheel assembly is pivotable about the stem when the engagement portion is in the intermediate state until the wheel assembly is in the predetermined position, the engagement portion moving to the engaged state when the wheel assembly is in the predetermined position; and
      the base portion including an aperture sized to receive the stem and being adapted to cooperate with the chassis element to maintain the engagement portion in a predetermined relation to the chassis element.

7. An adjustable bed according to claim 6 in which the base portion has a top surface adapted to mate with a bottom part of the chassis element to maintain the base portion in the predetermined relation to the chassis element.

8. An adjustable bed according to claim 7 in which the chassis element comprises a tube, the tube having an exterior wall, and in which the stem is positioned substantially coaxially in the tube and the base portion has an upper surface formed to cooperate with the bottom part of the exterior wall of the tube to maintain the base portion in the predetermined relation to the chassis element.

9. An adjustable bed according to claim 8 in which the engagement portion includes at least one slot adapted to receive a segment portion of said at least one wheel assembly to restrain said at least one wheel assembly from pivoting about the stem when the engagement portion is in the engaged state.

10. An adjustable bed according to claim 9 in which the engagement portion is adapted to cooperate with said at least one wheel assembly to maintain the engagement portion in the intermediate state until said at least one wheel assembly is in the predetermined position.

11. An adjustable bed according to claim 10 in which the engagement portion comprises a fork including two tines, said at least one slot being defined between the tines.

12. An adjustable bed according to claim 6 in which the engagement portion is pivotally attached to the base portion by a hinge means including a hinge pin, the engagement portion being pivotable about a hinge axis defined by the hinge pin.

13. An adjustable bed according to claim 12 in which the engagement portion is positionable in the engaged state when the wheel axis is substantially parallel to the hinge axis and said at least one wheel assembly is in the predetermined position relative to the chassis element.

14. An adjustable bed according to claim 13 in which said at least one wheel assembly includes a brake mechanism movable between a locked condition, in which the brake mechanism prevents rotation of the wheel about the wheel axis, and a released condition, in which the brake mechanism permits the wheel to rotate about the wheel axis.

15. A directional lock for a caster, the caster having a wheel assembly with a wheel rotatable about a wheel axis and a housing supporting the wheel, and a stem supported by the housing and positionable in a chassis element, the wheel assembly being pivotally attached to the stem, the directional lock having:
   an engagement portion for engaging the wheel assembly to locate the wheel assembly in a predetermined position relative to the chassis element;
   a base portion coupled to the engagement portion, the engagement portion being movable relative to the base portion between an engaged state, in which the engagement portion maintains the wheel assembly in the predetermined position, and a disengaged state, in which the wheel assembly is pivotable about the stem;
   the engagement portion being maintainable in the engaged state by gravity; and
   the base portion being adapted to cooperate with the chassis element to maintain the engagement portion in a predetermined relation to the chassis element.

16. A directional lock according to claim 15 in which the directional lock is maintainable in the disengaged state by gravity.

17. An adjustable bed to be positioned on a floor, the adjustable bed having:
   a primary frame for supporting a mattress frame;
   at least one leg assembly attached to the primary frame for supporting the primary frame and moving the primary frame relative to the floor, said at least one leg assembly including a chassis element;
   at least one caster including a wheel assembly having:
      a wheel rotatable about a wheel axis;
      a housing for supporting the wheel;
   said at least one caster including a stem supported by the housing;
   the wheel assembly being pivotally attached to the stem;
   the stem being positioned in the chassis element;
   said at least one caster supporting said at least one leg assembly above the floor; and
   at least one directional lock for said at least one caster, said at least one directional lock having:
      an engagement portion for engaging the wheel assembly to locate the wheel assembly in a predetermined position relative to the chassis element;
      a base portion coupled to the engagement portion, the engagement portion being movable relative to the base portion between an engaged state, in which the engagement portion maintains the wheel assembly in the predetermined position, and a disengaged state, in which the wheel assembly is pivotable about the stem;
      the engagement portion being maintainable in the engaged state by gravity; and
      the base portion being adapted to cooperate with the chassis element to maintain the engagement portion in a predetermined relation to the chassis element.

18. An adjustable bed according to claim 17 in which the directional lock is maintainable in the disengaged state by gravity.

19. An adjustable bed to be positioned on a floor, the adjustable bed having:
   a primary frame for supporting a mattress frame;
   at least one leg assembly attached to the primary frame for supporting the primary frame and moving the primary frame relative to the floor, said at least one leg assembly including a chassis element;
   at least one caster including a wheel assembly having:
      a wheel rotatable about a wheel axis;
      a housing for supporting the wheel;
   said at least one caster including a stem supported by the housing;
   the wheel assembly being pivotally attached to the stem;
   the stem being positioned in the chassis element;
   said at least one caster supporting said at least one leg assembly above the floor; and
   at least one directional lock for said at least one caster, said at least one directional lock having:
      an engagement portion for engaging the wheel assembly to locate the wheel assembly in a predetermined position relative to the chassis element;
      a base portion coupled to the engagement portion, the engagement portion being movable relative to the base portion between an engaged state, in which the engagement portion maintains the wheel assembly in the predetermined position, and a disengaged state, in which the wheel assembly is pivotable about the stem; and
      the base portion being adapted to cooperate with the chassis element to maintain the engagement portion in a predetermined relation to the chassis element.

20. An adjustable bed according to claim 19 in which the base portion includes an aperture in which the stem is receivable, for positioning the directional lock relative to said at least one caster and the chassis element.

21. An adjustable bed according to claim 19 in which the chassis element includes a wall surface and the base portion includes a lip adapted to engage the wall surface, to hold the base portion stationary relative to the chassis element such that the engagement portion is maintained in the predetermined relation to the chassis element.

* * * * *